(12) United States Patent
Iwamoto et al.

(10) Patent No.: US 11,914,082 B2
(45) Date of Patent: Feb. 27, 2024

(54) RANGING DEVICE, RANGING METHOD, AND RECORDING MEDIUM

(71) Applicant: Panasonic Intellectual Property Management Co., Ltd., Osaka (JP)

(72) Inventors: Takuya Iwamoto, Osaka (JP); Tadashi Morita, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/992,661

(22) Filed: Nov. 22, 2022

(65) Prior Publication Data
US 2023/0305127 A1    Sep. 28, 2023

(30) Foreign Application Priority Data
Mar. 23, 2022    (JP) ................................. 2022-046979

(51) Int. Cl.
G01S 7/526    (2006.01)
G01S 15/931    (2020.01)

(52) U.S. Cl.
CPC ............ G01S 7/526 (2013.01); G01S 15/931 (2013.01)

(58) Field of Classification Search
CPC ....... G01S 15/931; G01S 7/526; G01S 15/101
See application file for complete search history.

(56) References Cited

U.S. PATENT DOCUMENTS

| 2005/0086013 | A1* | 4/2005 | Couch | G01S 7/526 |
| | | | | 702/158 |
| 2011/0280106 | A1* | 11/2011 | Reiche | G01S 7/526 |
| | | | | 367/100 |
| 2017/0227640 | A1* | 8/2017 | Nomura | G08G 1/166 |
| 2019/0079187 | A1* | 3/2019 | Tsuji | G01S 15/10 |
| 2020/0225348 | A1* | 7/2020 | Shinkai | G01S 15/931 |

FOREIGN PATENT DOCUMENTS

JP    2003057340 A    2/2003

* cited by examiner

*Primary Examiner* — Daniel L Murphy
*Assistant Examiner* — Amie M Ndure
(74) *Attorney, Agent, or Firm* — Seed IP Law Group LLP

(57) ABSTRACT

A ranging device includes transducers, a transmission circuit, a reception circuit, a transfer data generation circuit, and a transfer circuit. The transmission circuit causes the transducers to transmit transmission waves. The reception circuit outputs a received signal obtained by digitizing a reflected wave of the transmission wave with a sampling frequency equal to or more than a frequency of the transmission wave. The generation circuit separates, into a target period and a non-target period, time-series received signals. The target period is a period in which a wave height is equal to or more than a threshold. The non-target period is a period in which a wave height is less than the threshold. The generation circuit performs thinning-out processing on received signals in the non-target period and generates waveform information indicating a waveform received by the transducer. The transfer circuit outputs the waveform information.

19 Claims, 17 Drawing Sheets

RANGING DEVICE, RANGING METHOD, AND RECORDING MEDIUM

CROSS-REFERENCE TO RELATED APPLICATIONS

This application is based upon and claims the benefit of priority from Japanese Patent Application No. 2022-046979, filed on Mar. 23, 2022, the entire contents of which are incorporated herein by reference.

FIELD

The present disclosure relates generally to a ranging device, a ranging method, and a recording medium.

BACKGROUND

There is a known technique for detecting an object such as an obstacle, preceding vehicle, or pedestrian by using a transducer such as an ultrasonic sensor installed in a vehicle. There is also a known technique for performing various kinds of vehicle control to improve traveling safety of a vehicle, such as operation of an automatic brake and notification to a driver, on the basis of an object detection result by a transducer.

As a method of detecting an object, for example, a transducer receives a reflected wave from an obstacle and converts a received signal corresponding to the reflected wave into a reception waveform. The transducer performs threshold determination and calculates a distance from the obstacle on the basis of a time at which the reception waveform is equal to or more than the threshold. Then, the transducer outputs the distance to a control device that controls the transducer (for example, JP 2003-057340 A).

However, in the above-described related arts, the threshold determination is performed on the received signal, so that waveform information of the received signal, such as an amplitude and a phase, is lost. Therefore, information about the obstacle detected by the transducer is partially missing. An amount of the waveform information of the received signal is too large to be transmitted to the control device that controls the transducer, and a communication speed between the transducer and the control device is insufficient. Therefore, real-time property is lost. Accordingly, further improvement is needed in order for the transducer to detect more obstacle information.

SUMMARY

A ranging device according to the present disclosure includes transducers, a transmission circuit, a reception circuit, a transfer data generation circuit, and a transfer circuit. The transmission circuit is configured to cause at least one of the transducers to transmit a transmission wave. The reception circuit is configured to output a received signal obtained by digitizing a reflected wave of the transmission wave by using a sampling frequency equal to or more than a frequency of the transmission wave. The reflected wave is received by each of the transducers. The transfer data generation circuit is configured to separate, into a target period and a non-target period, time-series received signals output from the reception circuit. The target period is a period in which a wave height is equal to or more than a threshold. The non-target period is a period in which a wave height is less than the threshold. The transfer data generation circuit is further configured to perform thinning-out processing on received signals in the non-target period and generate waveform information indicating a waveform received by the transducer. The transfer circuit is configured to output the waveform information generated by the transfer data generation circuit.

DETAILED DESCRIPTION

Hereinafter, embodiments of a ranging device according to the present disclosure will be described with reference to the drawings.

First Embodiment

Figure 1:
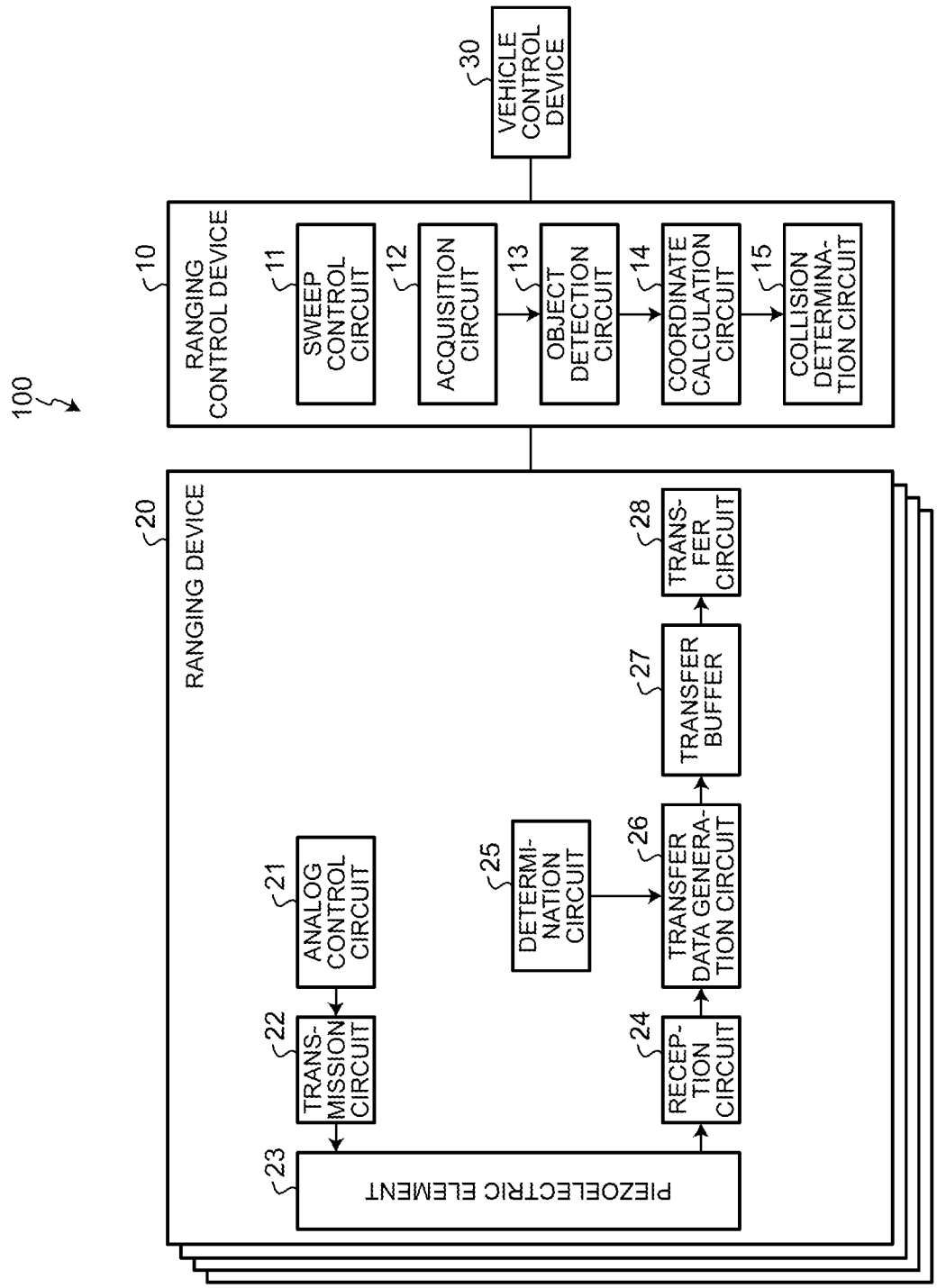
FIG. 1 is a block diagram illustrating an example of a configuration of a ranging system according to a first embodiment.

FIG. 1 illustrates a configuration of a ranging system according to a first embodiment. A ranging system 100 is installed in a vehicle (not illustrated), for example. As illustrated in FIG. 1, the ranging system 100 includes a ranging control device 10, a ranging device 20, and a vehicle control device 30. The ranging system 100 may further include other devices. In FIG. 1, the ranging control device 10, the ranging device 20, and the vehicle control device 30 are illustrated as different devices, whereas part of or all these devices may be integrated as one body. The ranging system 100 may include two or more ranging devices 20.

The ranging control device 10 controls the ranging device 20. The ranging control device 10 detects an object existing around the vehicle on the basis of waveform information acquired from the ranging device 20. The ranging control device 10 includes a sweep control circuit 11, an acquisition circuit 12, an object detection circuit 13, a coordinate calculation circuit 14, and a collision determination circuit 15.

The sweep control circuit 11 performs sweep control such that the ranging device 20 transmits an ultrasonic wave (hereinafter, also referred to as a transmission wave). Specifically, the sweep control circuit 11 performs sweep control such that the ranging device 20 transmits a transmission wave in order to detect the object existing around the vehicle.

In the present embodiment, the term "object" or "obstacle" includes a pedestrian and another vehicle. An object that does not hinder traveling of the vehicle, such as unevenness of a road surface, is not included in the obstacle.

The acquisition circuit 12 acquires waveform information. Specifically, the acquisition circuit 12 acquires waveform information output from the ranging device 20.

The object detection circuit 13 detects the object existing around the vehicle on the basis of the waveform information. Specifically, the object detection circuit 13 detects the object existing around the vehicle on the basis of a period of time from when one ranging device 20 transmits a transmission wave to when two or more ranging devices 20 receive a reflected wave reflected by the obstacle existing around the vehicle and returning therefrom. The period of time is included in the waveform information acquired by the acquisition circuit 12. The waveform information will be described in detail later.

The coordinate calculation circuit 14 calculates coordinates of the object detected by the object detection circuit 13. Specifically, the coordinate calculation circuit 14 calculates coordinates (hereinafter, also referred to as a detection point) of the object existing around the vehicle on the basis of the period of time from when the one ranging device 20 transmits the transmission wave to when the two or more ranging devices 20 receive the reflected wave reflected by the obstacle existing around the vehicle and returning therefrom. The period of time is included in the waveform information acquired by the acquisition circuit 12.

The collision determination circuit 15 determines a possibility of collision between the obstacle corresponding to the detection point and the vehicle. Specifically, in a case where the detection point detected by the coordinate calculation circuit 14 intersects with the vehicle, the collision determination circuit 15 determines whether or not there is a possibility of collision between the vehicle and the obstacle corresponding to the detection point.

The ranging device 20 includes an analog control circuit 21, a transmission circuit 22, a piezoelectric element 23, a reception circuit 24, a transfer data generation circuit 26, a transfer buffer 27, and a transfer circuit 28. In the present embodiment, two or more ranging devices 20 are provided in the vehicle. The ranging devices 20 are arranged at positions in the vehicle advantageous for detection or ranging of a surrounding object. For example, the ranging devices 20 are arranged on bumpers at a front end and a rear end of the vehicle at a distance to detect objects in front of and behind the vehicle.

Each ranging device 20 transmits a transmission wave on the basis of sweep control performed by the ranging control device 10. The ranging device 20 is, for example, sonar.

The analog control circuit 21 controls the transmission circuit 22 on the basis of processing controlled by the sweep control circuit 11. Specifically, as the processing controlled by the sweep control circuit 11, the analog control circuit 21 controls the transmission circuit 22 such that the transmission circuit 22 applies an AC voltage to the piezoelectric element 23. The AC voltage to be applied to the piezoelectric element 23 by the transmission circuit 22 is, for example, 40 kHz to 75 kHz.

The transmission circuit 22 operates on the basis of processing controlled by the analog control circuit 21. For example, the transmission circuit 22 applies a pulsed AC voltage to the piezoelectric element 23.

The piezoelectric element 23 deforms in accordance with the applied voltage and transmits an ultrasonic wave (hereinafter, also referred to as a transmission wave) with substantially the same frequency. Specifically, when the transmission circuit 22 operates, an AC voltage is applied to the piezoelectric element 23. Then, the piezoelectric element deforms in accordance with the AC voltage and transmits an ultrasonic wave with the same frequency. The ultrasonic wave to be transmitted is pulsed. When the pulsed ultrasonic waves hit against a road surface or an obstacle, the pulsed ultrasonic wave is reflected, and a part thereof returns to the ranging device 20. Then, the piezoelectric element 23 converts, into a voltage, a sound pressure of the reflected wave applied to a surface of the piezoelectric element 23 and outputs the voltage proportional to the sound pressure of the received sound to the reception circuit 24. The piezoelectric element 23 is an example of a transducer.

The reception circuit 24 acquires the voltage output from the piezoelectric element 23. The reception circuit 24 performs digital conversion of the acquired voltage output from the piezoelectric element 23 by using a sampling frequency that is substantially more than twice a frequency of the transmitted ultrasonic wave.

In the present embodiment, the AC voltage applied to the piezoelectric element 23 by the transmission circuit 22 is, for example, 40 kHz to 75 kHz as described above. Therefore, the sampling frequency of the reception circuit 24 can be set to 80 kHz to 150 kHz or more, for example, 1.25 MHz, which is more than twice the frequency of the transmitted ultrasonic wave. Moreover, the reception circuit 24 performs analog-to-digital conversion on the voltage output from the piezoelectric element 23 to obtain a received signal (hereinafter, also referred to as an AD value) and outputs the received signal to the transfer data generation circuit 26.

A determination circuit 25 performs threshold determination on the received signal. Specifically, the determination circuit 25 performs threshold determination on the AD value output from the reception circuit 24. The AD value obtained by performing the above-described analog-to-digital conversion by the reception circuit 24 may include, for example, noise (for example, thermal noise). In order to remove the noise, the determination circuit 25 sets a threshold α and performs threshold determination on the AD value output from the reception circuit 24.

The transfer data generation circuit 26 acquires the AD value output from the reception circuit 24. The transfer data generation circuit 26 specifies a target period in which a wave height is equal to or more than the threshold from time-series received signals output from the reception circuit. The transfer data generation circuit 26 separates the time-series received signals into the target period and a non-target period. The non-target period is a period in which the wave height is less than the threshold. Then, the transfer data generation circuit 26 performs processing (thinning-out processing) for thinning out received signals in the non-target period, and generates waveform information indicating a waveform received by the transducer.

The waveform information indicates a relationship between the AD value output from the reception circuit 24 and time. Specifically, in a case where the determination circuit 25 compares the AD value with the threshold and determines that the AD value is equal to or more than the threshold, the transfer data generation circuit 26 specifies a period in which a wave height is equal to or more than the threshold and predetermined periods before and after the period as the target period from the time-series received signals output from the reception circuit. The waveform information includes at least one of a start time of the target period, an end time of the target period, and a sampling cycle of the target period.

Figure 2:
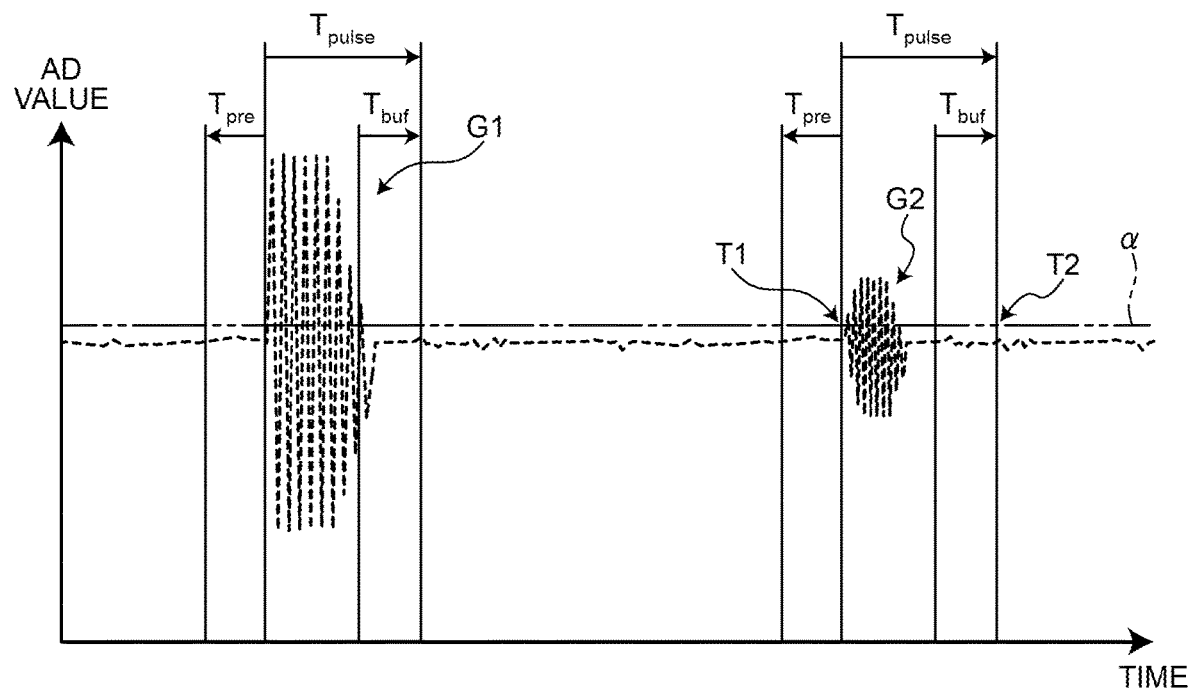
FIG. 2 is a graph illustrating an example of waveform information generated by a ranging device according to the first embodiment.

The thinning-out processing performed by the transfer data generation circuit 26 will be described with reference to FIG. 2. FIG. 2 is a graph illustrating the waveform information generated by the transfer data generation circuit 26. The horizontal axis represents time, and the vertical axis represents the AD value. The threshold α is used for performing threshold determination by the determination circuit 25.

The determination circuit 25 compares the AD value with the threshold α and determines whether the AD value is equal to or more than the threshold a. When the AD value is determined to be equal to or more than the threshold α, the transfer data generation circuit 26 generates, as the waveform information, the AD value output from the reception circuit 24 in a predetermined period of time $T_{pulse}$. Thereafter, the transfer data generation circuit 26 outputs the generated waveform information to the transfer buffer 27.

A graph G1 illustrated in FIG. 2 represents reverberation of the piezoelectric element 23. The piezoelectric element 23 continuously vibrates even after stopping transmission (for example, application of an AC voltage is stopped). Such a vibration after the application of the AC voltage is stopped is indicated by the graph G1. A graph G2 illustrated in FIG. 2 represents a reflected wave reflected by the object existing around the vehicle and returning therefrom.

The determination circuit 25 compares the AD value with the threshold. When the AD value is equal to or more than the threshold during a period of time $T_{buf}$ before the predetermined period of time $T_{pulse}$ ends, the transfer data generation circuit 26 may generate the AD value as the waveform information again during the period of time $T_{buf}$ after a time when the AD value exceeds the threshold or may generate the AD value as the waveform information again during the period of time $T_{buf}$ after the predetermined period of time $T_{pulse}$ ends. The transfer data generation circuit 26 may not generate waveform information in a case where the AD value is less than the threshold during $T_{buf}$.

The determination circuit 25 compares the AD value with the threshold. Then, when the AD value is equal to or more than the threshold, the transfer data generation circuit 26 may generate the AD value output from the reception circuit 24 as the waveform information and generate the waveform information until the AD value becomes less than the threshold.

The transfer data generation circuit 26 generates, as the waveform information, an AD value included in a certain period of time $T_{pre}$ before the AD value becomes equal to or more than the threshold, in addition to the AD value output from the reception circuit 24 in the predetermined period of time $T_{pulse}$. As a result, the transfer data generation circuit 26 can generate waveform information of the AD value below the threshold, which follows the AD value above the threshold of a predetermined period of time $T_{pulse}$, so that the transfer data generation circuit 26 can accurately obtain the waveform received by the transceiver.

Moreover, the transfer data generation circuit 26 acquires a time of flight (TOF) indicating a measurement value of a period of time from the transmission from the piezoelectric element 23 to reception of a received wave reflected by a target object. Specifically, the transfer data generation circuit 26 acquires a start time T1 and a stop time T2 of the AD value together with the generated waveform information and outputs the start time, the stop time, and the waveform information to the transfer buffer 27. The transfer data generation circuit 26 may also sequentially output the generated waveform information to the transfer buffer 27.

The transfer data generation circuit 26 generates, as the waveform information, the reverberation of the piezoelectric element 23 and the reflected wave reflected by the object existing around the vehicle and returning therefrom. The transfer data generation circuit 26 may not generate waveform information for the AD value which is less than the threshold α.

The transfer data generation circuit 26 does not generate waveform information including unnecessary information such as noise. In order for the ranging control device 10 to detect the object existing around the vehicle, the transfer data generation circuit 26 specifies the target period and generates the target period as the waveform information. The transfer data generation circuit 26 specifies the target period and does not output unnecessary information. Therefore a transmission time can be suppressed.

The transfer buffer 27 stores the waveform information output from the transfer data generation circuit 26. The transfer circuit 28 transfers the waveform information generated by the transfer data generation circuit 26. Specifically, the transfer circuit 28 outputs the waveform information stored in the transfer buffer 27 to the ranging control device 10.

The vehicle control device 30 controls various behaviors of the vehicle. For example, in a case where the collision determination circuit 15 determines that there is a possibility of collision between the obstacle corresponding to the detection point and the vehicle, the vehicle control device 30 warns a user that there is a possibility of collision with the obstacle. The function of the vehicle control device 30 is not limited thereto.

Figure 3:
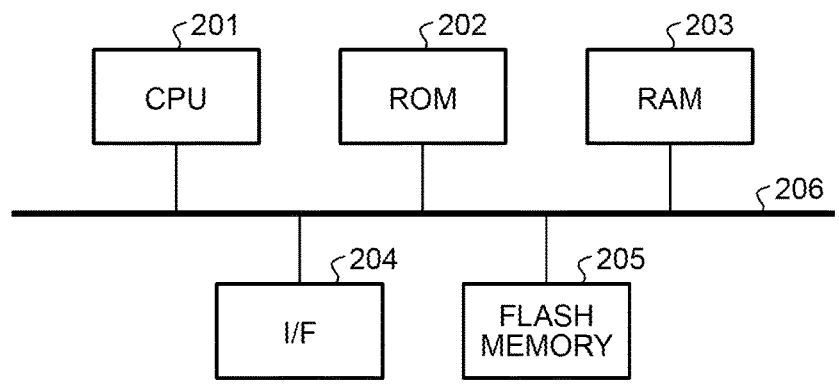
FIG. 3 illustrates an example of a hardware configuration of the ranging device according to the first embodiment.

Next, a hardware configuration of the ranging device 20 will be described. As illustrated in FIG. 3, the ranging device 20 has a hardware configuration using a normal computer in which a central processing unit (CPU) 201, a read only memory (ROM) 202, a random access memory (RAM) 203, an interface (I/F) 204, a flash memory 205, and the like are connected to one another by a bus 206.

The CPU 201 is an arithmetic unit that controls the entire ranging device 20. The CPU 201 is an example of a processor, and another processor or a processing circuit may be provided instead of the CPU 201. The ROM 202 stores programs and the like for implementing various kinds of processing by the CPU 201. The RAM 203 is, for example, a primary storage of the ranging device 20 and stores data used for various kinds of processing by the CPU 201.

The I/F 204 is an interface for transmitting and receiving data to and from the ranging control device 10 and is, for example, a controller area network (CAN). The I/F 204 may transmit and receive information to and from another device installed in the vehicle via a CAN or the like in the vehicle. The flash memory 205 is an example of a writable nonvolatile storage medium. The ROM 202, the RAM 203, and the flash memory 205 are also referred to as storage circuits. The ranging device 20 may include another storage device such as a hard disk drive (HDD) instead of the flash memory 205 or in addition to the flash memory 205.

Hardware configurations of the ranging control device 10 and the vehicle control device 30 also include, for example, a processing circuit such as a CPU, a ROM, a RAM, an I/F, a flash memory, and the like.

Figure 4:
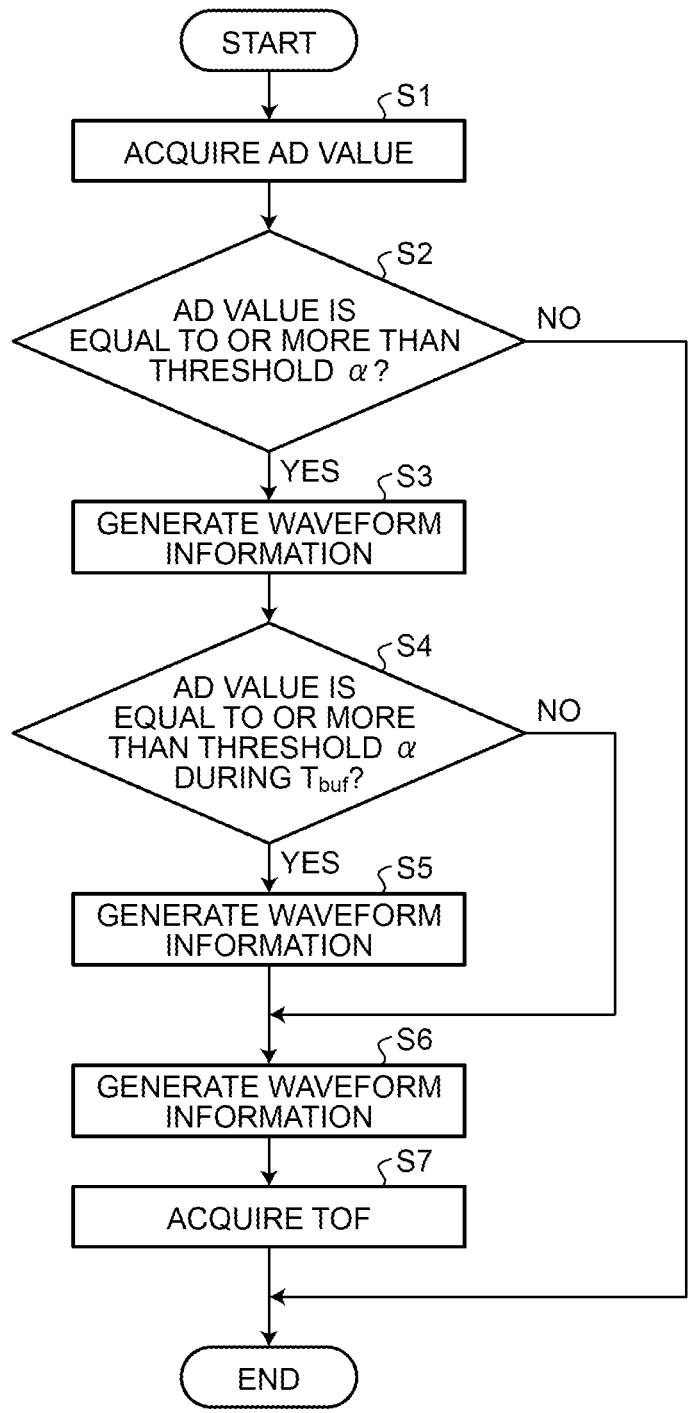
FIG. 4 is a flowchart illustrating an example of an operation of the ranging device according to the first embodiment.

Next, an operation performed by the ranging device 20 configured as described above will be described. In FIG. 4, the reception circuit 24 performs analog-to-digital conversion on the voltage output from the piezoelectric element 23 and outputs the AD value to the transfer data generation circuit 26.

The transfer data generation circuit 26 acquires the AD value output from the reception circuit 24 (step S1). Then, the determination circuit 25 determines whether or not the AD value is equal to or more than the threshold α (step S2). In a case where the determination circuit 25 determines that the AD value is less than the threshold α (step S2: No), the processing ends. On the other hand, in a case where the determination circuit 25 determines that the AD value is equal to or more than the threshold α (step S2: Yes), the processing proceeds to step S3.

In the case where the determination circuit 25 determines that the AD value is equal to or more than the threshold α, the transfer data generation circuit 26 generates waveform information for the AD value output from the reception circuit 24 (step S3). The transfer data generation circuit 26 outputs the generated waveform information to the transfer buffer 27.

Subsequently, the determination circuit 25 determines whether or not the AD value is equal to or more than the threshold α during the period of time $T_{buf}$ before the predetermined period of time $T_{pulse}$ elapses (step S4). In a case where the determination circuit 25 determines that the AD value is less than the threshold α (step S4: No), the processing proceeds to step S6. On the other hand, in a case where the determination circuit 25 determines that the AD value is equal to or more than the threshold α (step S4: Yes), the processing proceeds to step S5.

In the case where the determination circuit 25 determines that the AD value is equal to or more than the threshold α during the period of time $T_{buf}$ before the predetermined period of time $T_{pulse}$ elapses, the transfer data generation circuit 26 generates waveform information for the AD value output from the reception circuit 24 (step S5). The transfer data generation circuit 26 outputs the generated waveform information to the transfer buffer 27.

Subsequently, the transfer data generation circuit 26 generates, as the waveform information, the AD value included in the certain period of time $T_{pre}$ before the AD value becomes equal to or more than the threshold (step S6). The transfer data generation circuit 26 outputs the generated waveform information to the transfer buffer 27. Note that step S6 may be omitted.

Subsequently, the transfer data generation circuit 26 acquires the TOF indicating the measurement value of the period of time from the transmission from the piezoelectric element 23 to the reception of the received wave reflected by the target object (step S7). The transfer data generation circuit 26 outputs the acquired TOF to the transfer buffer 27. When step S7 ends, the processing ends.

Figure 5:
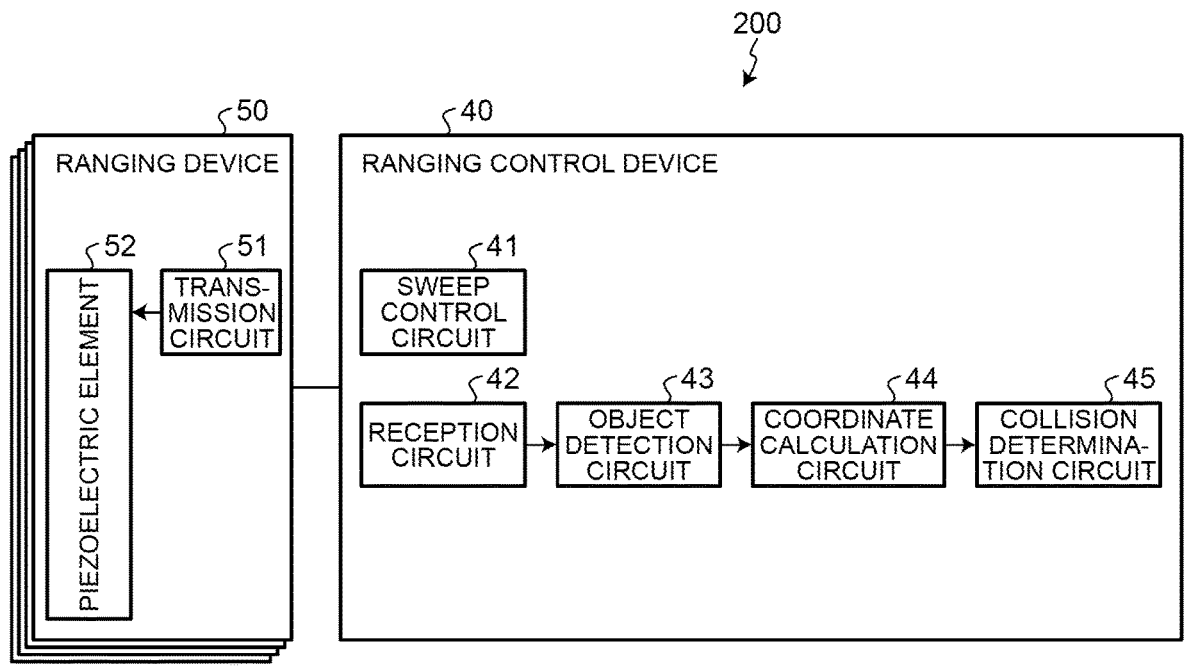
FIG. 5 is a block diagram illustrating an example of a configuration of a ranging system according to a comparative example.

Next, advantages of the ranging system 100 according to the first embodiment will be described by using comparative examples. A ranging system 200 according to a comparative example illustrated in FIG. 5 includes a ranging control device 40 and a ranging device 50.

The ranging control device 40 includes a sweep control circuit 41, a reception circuit 42, an object detection circuit 43, a coordinate calculation circuit 44, and a collision determination circuit 45.

The sweep control circuit 41 performs sweep control such that the ranging device 50 transmits an ultrasonic wave. The reception circuit 42 acquires a voltage output from a piezoelectric element 52. The object detection circuit 43 detects the object existing around the vehicle on the basis of the voltage. The coordinate calculation circuit 44 calculates coordinates of the object detected by the object detection circuit 43. The collision determination circuit 45 determines a possibility of collision between the obstacle corresponding to the detection point and the vehicle.

The ranging device 50 includes a transmission circuit 51 and the piezoelectric element 52. The transmission circuit 51 applies an AC voltage to the piezoelectric element 52. The piezoelectric element 52 deforms in accordance with the AC voltage and transmits an ultrasonic wave having substantially the same frequency.

The ranging system 200 of the comparative example outputs the voltage (analog signal) output from the piezoelectric element 52 of the ranging device 50 to the ranging control device 40 and thus tends to be affected by noise. This is because the voltage output to the ranging control device 40 is a weak analog signal of about several mV and has low noise immunity.

The weak analog signal is transmitted for a long distance from, for example, sonars provided in front of and behind the vehicle to the ranging control device 40 through the ranging device 50 via lines. Therefore, various electromagnetic wave noises superimposed in the above-described process may be erroneously recognized as an obstacle detection signal. Moreover, peer to peer (P2P) connection is performed in order for the ranging control device 40 to control the ranging devices 50, so that harness connection may be complicated.

In contrast, in the ranging device 20 of the ranging system 100 according to the present embodiment, the reception circuit 24 acquires the voltage output from the piezoelectric element 23 and performs analog-to-digital conversion on the acquired voltage output from the piezoelectric element 23 at a frequency that is substantially more than twice the frequency of the transmitted ultrasonic wave. Therefore, the ranging system 100 has higher noise immunity than the ranging system 200 of the comparative example. Additionally, the ranging system 100 adopts a communication method using a CAN as the I/F 204, so that connection can be performed with a small number of harnesses.

Figure 6:
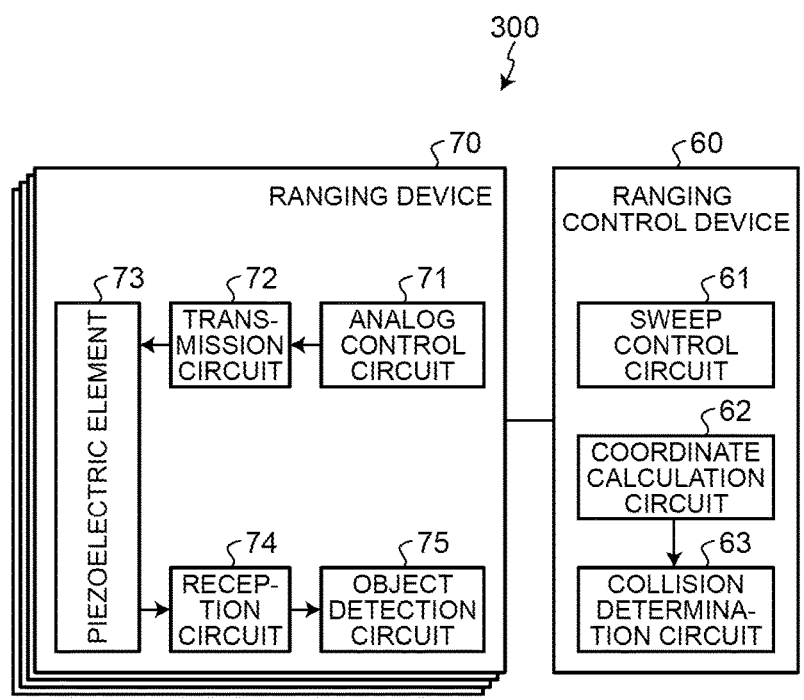
FIG. 6 is a block diagram illustrating an example of a configuration of a ranging system according to a comparative example.

A ranging system 300 according to another comparative example illustrated in FIG. 6 includes a ranging control device 60 and a ranging device 70. The ranging control device 60 includes a sweep control circuit 61, a coordinate calculation circuit 62, and a collision determination circuit 63.

The sweep control circuit 61 performs sweep control such that the ranging device 70 transmits an ultrasonic wave. The coordinate calculation circuit 62 calculates coordinates of the object detected by an object detection circuit 75. The collision determination circuit 63 determines a possibility of intersection between the detection point and the vehicle and collision between the obstacle corresponding to the detection point and the vehicle.

The ranging device 70 includes an analog control circuit 71, a transmission circuit 72, a piezoelectric element 73, a reception circuit 74, and the object detection circuit 75.

The analog control circuit 71 controls the transmission circuit 72 on the basis of processing controlled by the sweep control circuit 61. The transmission circuit 72 operates on the basis of processing controlled by the analog control circuit 71. The piezoelectric element 73 deforms in accordance with an AC voltage and transmits an ultrasonic wave having substantially the same frequency.

The reception circuit 74 acquires a voltage output from the piezoelectric element 73, performs analog-to-digital conversion, and generates an AD value. Then, the reception circuit 74 generates waveform information on the basis of a result of enveloping the AD value subjected to the analog-to-digital conversion and outputs the waveform information. The waveform information generated by the reception circuit 74 includes a TOF and a wave height value. The object detection circuit 75 detects the object existing around the vehicle on the basis of the waveform information output from the reception circuit 74.

In the ranging system 300 described above, the ranging device 70 detects the object on the basis of the waveform information including the TOF and the wave height value and outputs a result thereof to the ranging control device 60. Therefore, the result of detecting the object is transmitted to the ranging control device 60. Additionally, in a case where the AD value subjected to the analog-to-digital conversion by the reception circuit 74 is output to the ranging control device 60 as it is, the AD value to be transmitted is enormous because the AD value has not been scrutinized. For example, in a case where plural ranging devices 70 are connected to the ranging control device 60 via a bus, an amount of information becomes enormous, and an amount of communication increases. Thus, it is difficult to output the AD value in real time.

In contrast, in the ranging system 100 according to the present embodiment, the determination circuit 25 compares the AD value with the threshold. Then, in a case where the AD value is determined to be equal to or more than the threshold, the transfer data generation circuit 26 specifies the period in which the wave height is equal to or more than the threshold and the predetermined periods before and after the period as the target period from the time-series received signals output from the reception circuit. Then, the transfer data generation circuit 26 performs processing for thinning out received signals in a period other than the target period and generates waveform information indicating the waveform received by the transducer. Therefore, as compared with the ranging system 300 of the comparative example, the ranging system 100 of the present embodiment can suppress loss of real-time property related to an amount of waveform information of a received signal and data transmission.

Second Embodiment

A second embodiment will be described with reference to the drawings. Description of parts common to those of the above-described first embodiment will be omitted as appropriate. Constituent elements similar to those in the first embodiment are denoted by the same reference signs, and description thereof will be omitted as appropriate.

Figure 7:
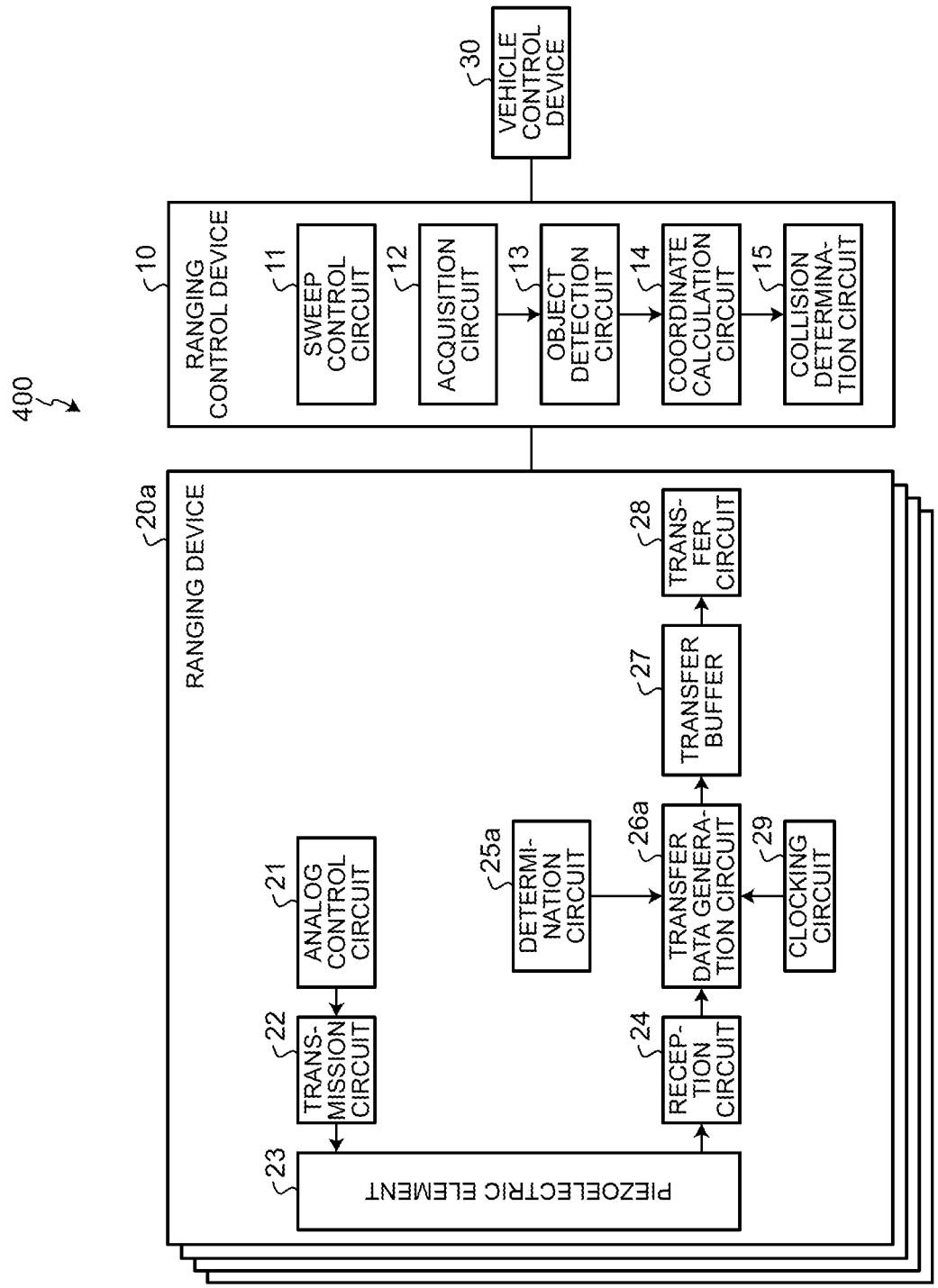
FIG. 7 is a block diagram illustrating an example of a configuration of a ranging system according to a second embodiment.

FIG. 7 is a block diagram illustrating an example of a configuration of a ranging system 400 according to a second embodiment. In the above-described first embodiment (FIG. 1), the transfer data generation circuit 26 generates waveform information on the basis of a result of determination by the determination circuit 25. In the second embodiment to be described hereinafter, a transfer data generation circuit 26a corresponding to the transfer data generation circuit 26 generates waveform information on the basis of a time at which the transducer transmits a transmission wave.

Specifically, as illustrated in FIG. 7, a ranging device 20a according to the second embodiment further includes a clocking circuit 29. The clocking circuit 29 clocks a time acquired by at least one transducer transmitting a transmission wave. Specifically, the clocking circuit 29 acquires a time at which the piezoelectric element 23 transmits the transmission wave. The clocking circuit 29 clocks a time by setting the time at which the piezoelectric element 23 transmits the transmission wave to zero. The clocking circuit 29 outputs the clocked time to the transfer data generation circuit 26a.

The transfer data generation circuit 26a clocks a time elapsed from when the transmission wave is transmitted on the basis of the time clocked by the clocking circuit 29 and specifies, as a target period, a period other than a period from a start of the time clocking until a stop of reverberation generated in the transducer that has transmitted the transmission wave. Then, the transfer data generation circuit 26a generates waveform information for a received signal output from the reception circuit 24. For example, the transfer data generation circuit 26a clocks the time elapsed from when the transmission wave is transmitted and changes processing of generating waveform information in accordance with the clocked value.

Figure 8:
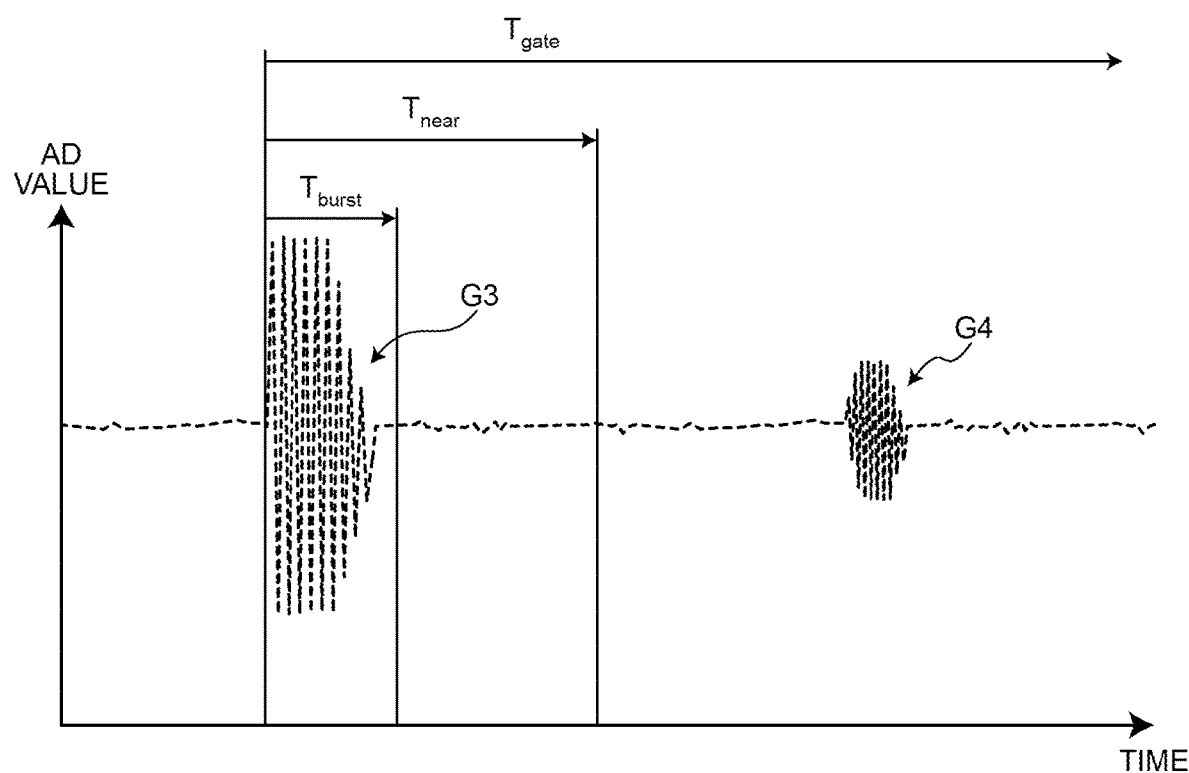
FIG. 8 is a graph illustrating an example of waveform information generated by a ranging device according to the second embodiment.

Processing performed by the transfer data generation circuit 26a will be described with reference to FIG. 8. FIG. 8 is a graph illustrating the waveform information generated by the transfer data generation circuit 26a. The horizontal axis represents time, and the vertical axis represents the AD value.

Specifically, when the clocking circuit 29 clocks a predetermined period of time $T_{near}$, the transfer data generation circuit 26a reduces the number of bits of the AD value output from the reception circuit 24 and generates waveform information. In this processing, when the transmission wave transmitted by the piezoelectric element 23 travels for a long distance, a wave height thereof becomes small, and the number of bits is reduced in order to reduce waveform information to be generated by the transfer data generation circuit 26a.

A graph G3 illustrated in FIG. 8 represents reverberation of the piezoelectric element 23. A graph G4 illustrated in FIG. 8 represents a reflected wave reflected by an obstacle existing around the vehicle and returning therefrom.

The transfer data generation circuit 26a performs thinning-out processing on received signals output from the reception circuit 24 on the basis of the time clocked by the clocking circuit 29 and generates waveform information. Specifically, the transfer data generation circuit 26a generates waveform information in which sampling rates are different between before and after the period of time $T_{near}$ clocked by the clocking circuit 29.

For example, the transfer data generation circuit 26a generates waveform information while thinning out the number of samples until the period of time $T_{near}$ elapses, and generates waveform information without thinning out the number of samples after the period of time $T_{near}$ elapses. Comparing the waveform information generated by the transfer data generation circuit 26a before the period of time $T_{near}$ clocked by the clocking circuit 29 with the waveform information after the period of time $T_{near}$, the number of samples of the waveform information generated when the period of time $T_{near}$ elapses is larger than the number of samples of the waveform information generated before the period of time $T_{near}$ elapses.

In this processing, when the transmission wave transmitted by the piezoelectric element 23 travels for a short distance, real-time property is required, and the number of samples of the waveform information generated before the period of time $T_{near}$ elapses is reduced in order to reduce waveform information to be generated by the transfer data generation circuit 26a. Note that, as long as the number of samples after the period of time $T_{near}$ elapses is larger than the number of samples before the period of time $T_{near}$ elapses, the number of samples may be thinned out after the period of time $T_{near}$ elapses.

Moreover, the transfer data generation circuit 26a generates waveform information until the clocking circuit 29 clocks a period of time $T_{gate}$. For example, the transfer data generation circuit 26a generates waveform information when a period of time $T_{burst}$, in which the received signal becomes sufficiently small, elapses after the piezoelectric element 23 starts transmission of the transmission wave. This processing is for thinning out transmission wave leakage in which vibration continues even after the piezoelectric element 23 transmits the transmission wave, for example, after application of the AC voltage is stopped. The period of time $T_{burst}$ is a period of time during which the AD value is less than the threshold after the piezoelectric element 23 starts transmission of the transmission wave.

The transfer data generation circuit 26a acquires transmission signal information regarding the transmission wave transmitted by the piezoelectric element 23 and outputs the generated waveform information and the acquired transmission signal information to the transfer buffer 27. This processing is for complementing a transmission signal from which the above-described transmission wave leakage is thinned out. The transmission signal information includes presence/absence of transmission from the related piezoelectric element 23, a transmission wave mode (for example, modulation/non-modulation, transmission signal length), and so forth.

The transfer data generation circuit 26a generates waveform information having different sampling rates before and after the period of time $T_{near}$ clocked by the clocking circuit 29. For example, the transfer data generation circuit 26a clocks the time elapsed from when the transmission wave is transmitted and changes a temporal resolution in accordance with the clocked value. The transfer data generation circuit 26a generates waveform information without losing waveform information used for detecting the object existing around the vehicle.

The transfer data generation circuit 26a does not output unnecessary information, so that a transmission time can be suppressed. The transfer data generation circuit 26a may clock the time elapsed from when the transmission wave is transmitted and change one or both of the number of bits of the wave height value and the temporal resolution in accordance with the clocked value.

Figure 9:
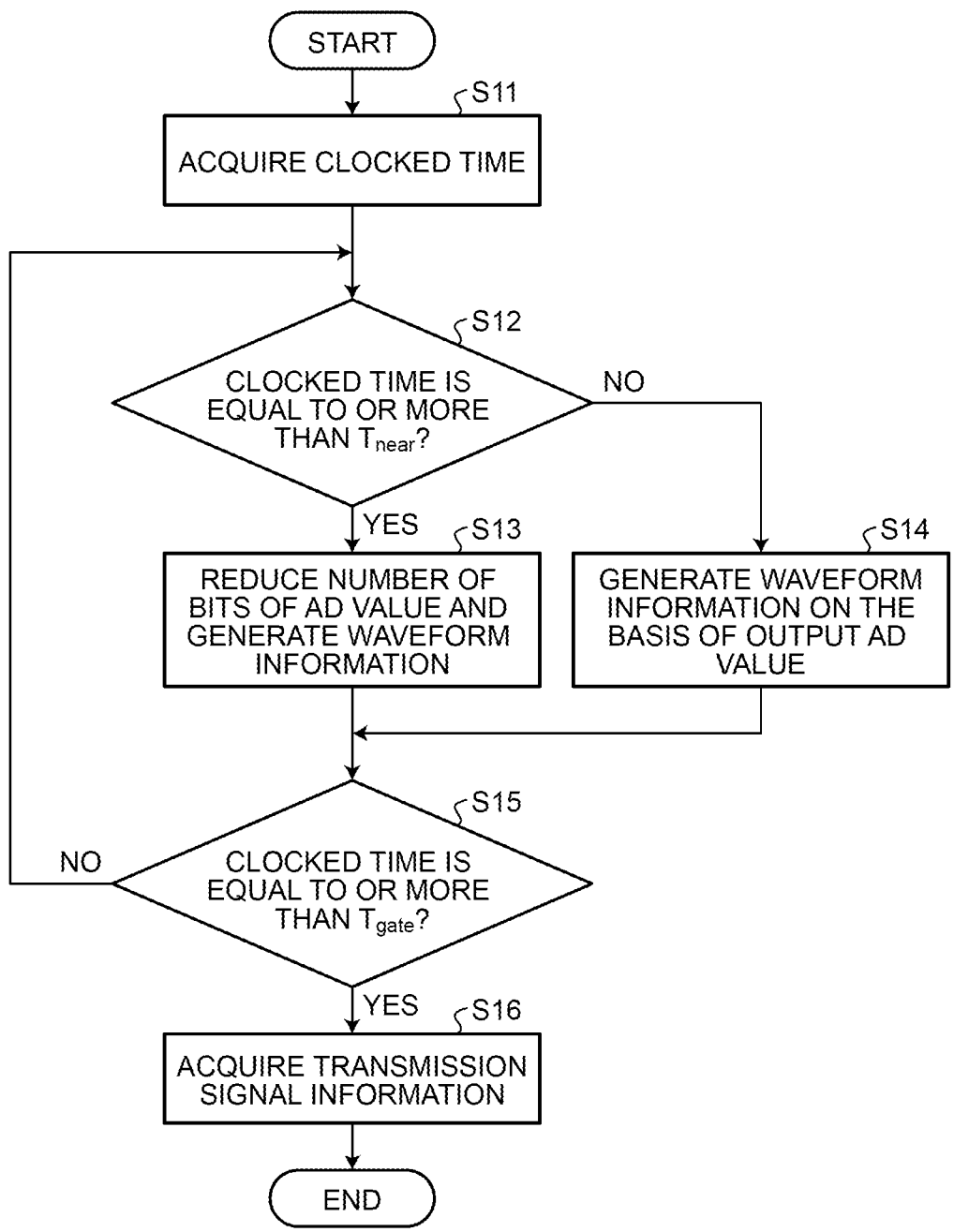
FIG. 9 is a flowchart illustrating an example of an operation of the ranging device according to the second embodiment.

Next, an operation performed by the ranging device 20a configured as described above will be described. FIG. 9 illustrates a case where the transfer data generation circuit 26a acquires the AD value output from the reception circuit 24.

The transfer data generation circuit 26a acquires a clocked time output from the clocking circuit 29 (step S11). A determination circuit 25a determines whether or not the clocked time is equal to or more than the predetermined period of time $T_{near}$ (step S12). In a case where the determination circuit 25a determines that the clocked time is equal to or more than the predetermined period of time $T_{near}$ (step S12: Yes), the processing proceeds to step S13. On the other hand, in a case where the determination circuit 25a determines that the clocked time is less than the predetermined period of time $T_{near}$ (step S12: No), the processing proceeds to step S14.

In the case where the determination circuit 25a determines that the clocked time is equal to or more than the predetermined period of time $T_{near}$, the transfer data generation circuit 26a reduces the number of bits of the AD value output from the reception circuit 24 and generates waveform information (step S13). The transfer data generation circuit 26a outputs the generated waveform information to the transfer buffer 27.

In the case where the determination circuit 25a determines that the clocked time is less than the predetermined period of time $T_{near}$, the transfer data generation circuit 26a generates waveform information for the AD value output from the reception circuit 24 (step S14). The transfer data generation circuit 26a outputs the generated waveform information to the transfer buffer 27.

The determination circuit 25a determines whether or not the clocked time is equal to or more than the predetermined period of time $T_{gate}$ (step S15). In a case where the determination circuit 25a determines that the clocked time is less than the predetermined period of time $T_{gate}$ (step S15: No), the processing returns to step S12. In a case where the determination circuit 25a determines that the clocked time is equal to or more than the predetermined period of time $T_{gate}$ (step S15: Yes), the processing proceeds to step S16.

In the case where the clocked time is determined to be equal to or more than the predetermined period of time $T_{gate}$, the transfer data generation circuit 26a acquires transmission signal information on the transmission wave transmitted by the piezoelectric element 23 (step S16). The transfer data generation circuit 26a outputs the acquired transmission signal information to the transfer buffer 27. When step S16 ends, the processing ends.

As described above, the ranging device 20a according to the second embodiment clocks a time elapsed from when a transmission wave is transmitted, and specifies, as a target period, a period other than a period from a start of time clocking until a stop of reverberation generated in the transducer that has transmitted the transmission wave. Then, the ranging device 20a generates waveform information. Therefore, the ranging device 20a of the second embodiment can suppress loss of real-time property related to an amount of waveform information of a received signal and data transmission.

Third Embodiment

Figure 10:
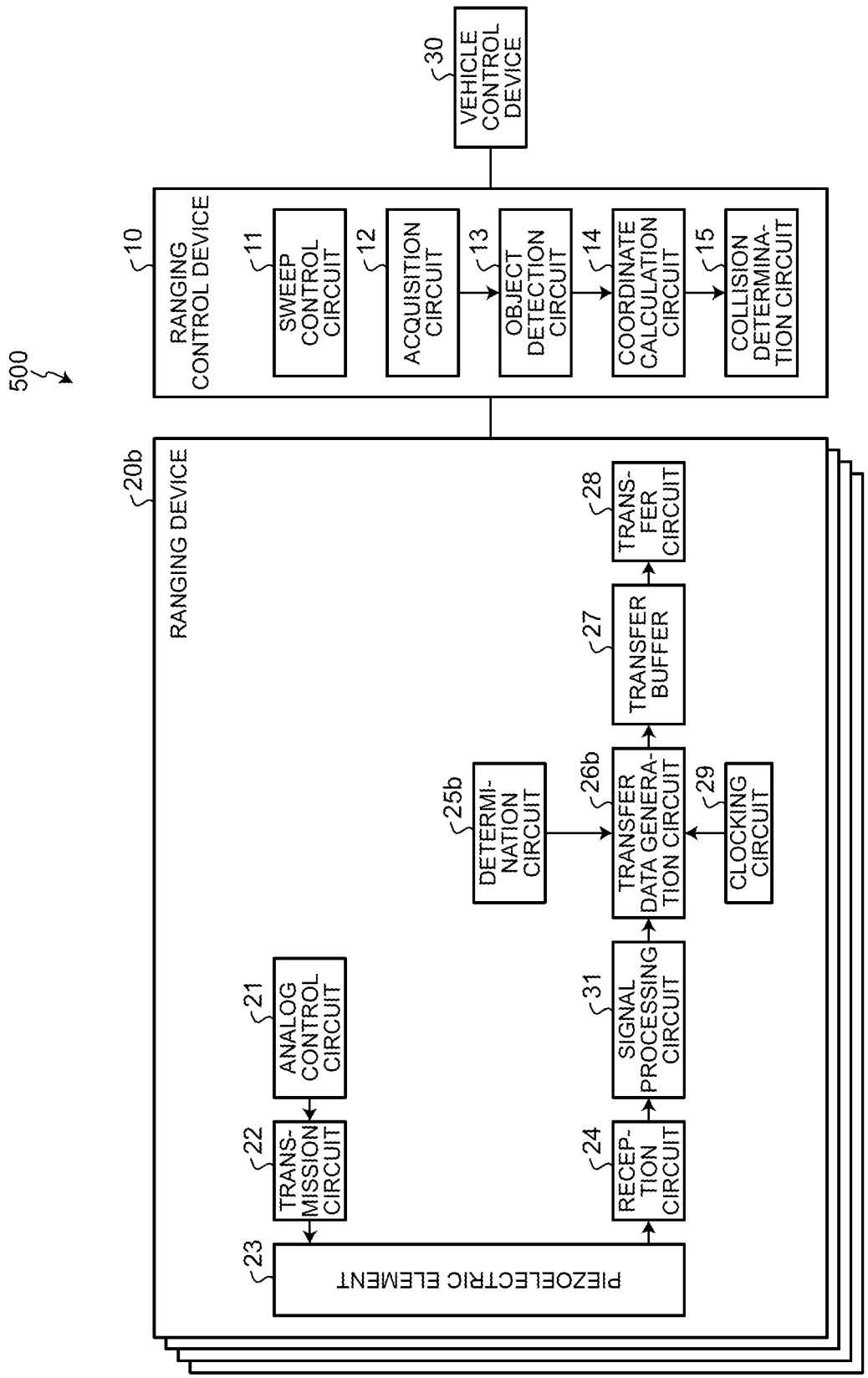
FIG. 10 is a block diagram illustrating an example of a configuration of a ranging system according to a third embodiment.

FIG. 10 is a block diagram illustrating an example of a configuration of a ranging system 500 according to a third embodiment. In the foregoing first embodiment (FIG. 1), the transfer data generation circuit 26 generates waveform information on the basis of a result of determination by the determination circuit 25. In the foregoing second embodiment (FIG. 7), the transfer data generation circuit 26a generates waveform information on the basis of a time at which the transducer transmits a transmission wave. In the third embodiment to be described hereinafter, a transfer data generation circuit 26b generates waveform information on the basis of a received signal output from the reception circuit 24 and a result of performing enveloping on the received signal.

Specifically, as illustrated in FIG. 10, a ranging device 20b according to the third embodiment further includes a signal processing circuit 31. The signal processing circuit 31 performs envelope processing for extracting an outline of an amplitude from the received signal output from the reception circuit 24. Additionally, the signal processing circuit 31 logarithmically transforms the received signal on which the envelope processing has been performed (hereinafter, such a received signal is also referred to as an envelope value). Moreover, the signal processing circuit 31 outputs the envelope value and the logarithmically transformed received signal (hereinafter, logarithmic transformation value) to the transfer data generation circuit 26b.

A determination circuit 25b performs threshold determination on the envelope value output from the signal processing circuit 31. Specifically, in order to remove noise, the determination circuit 25b sets the threshold α and performs threshold determination on the envelope value output from the signal processing circuit 31.

The determination circuit 25b compares the envelope value with the threshold α. Then, in a case where the envelope value is equal to or more than the threshold α, the transfer data generation circuit 26b specifies a target period in which a wave height is equal to or more than the threshold from a waveform of time-series received signals output from a reception circuit 24b and generates waveform information for the received signal output from the reception circuit 24b. In a case where the envelope value is less than the threshold α, the transfer data generation circuit 26b does not generate waveform information.

Figure 11:
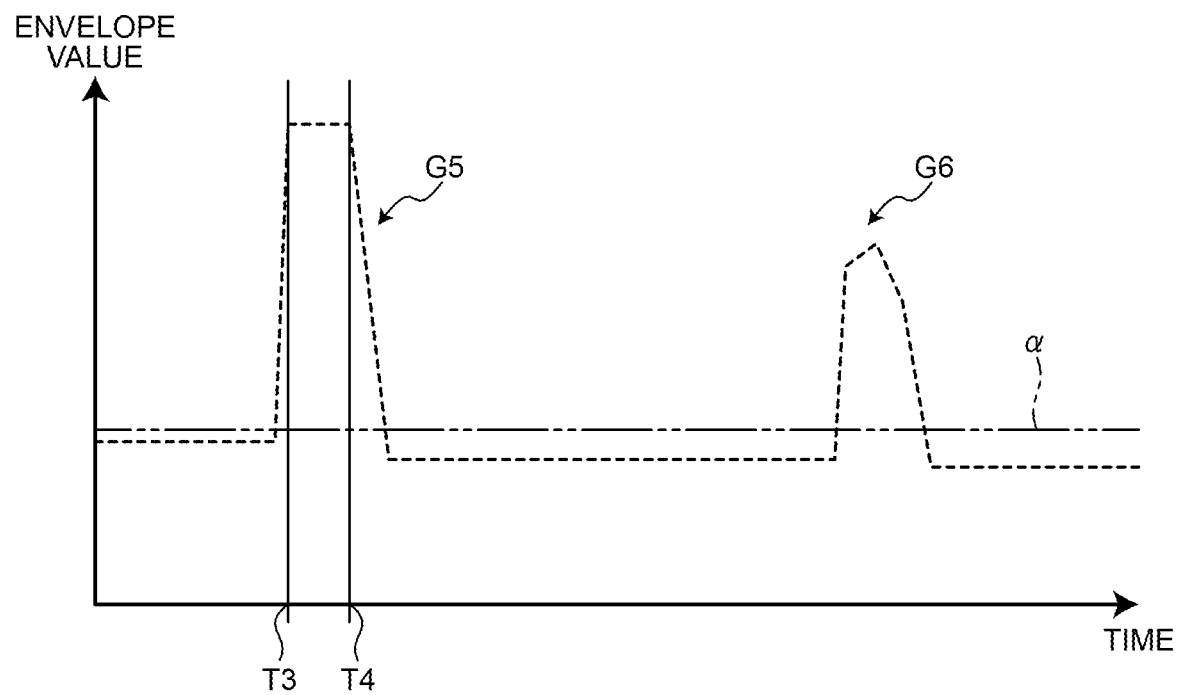
FIG. 11 is a graph illustrating an example of waveform information transferred by a ranging device according to the third embodiment.

Processing performed by the transfer data generation circuit 26b will be described with reference to FIG. 11. FIG. 11 is a graph illustrating waveform information generated by the transfer data generation circuit 26b. The horizontal axis represents time, and the vertical axis represents the envelope value. A graph G5 in FIG. 11 shows an envelope value that indicates reverberation of the piezoelectric element 23.

A graph G6 in FIG. 11 shows an envelope value corresponding to a reflected wave reflected by an obstacle existing around the vehicle and returning therefrom.

The transfer data generation circuit 26b acquires saturated state time information indicating a time T3 at which the envelope value is in a saturated state and a time T4 at which the saturated state is resolved. Then, the transfer data generation circuit 26b outputs, to the transfer buffer 27, the acquired saturated state time information together with the generated waveform information.

The transfer data generation circuit 26b generates waveform information without losing waveform information used for detecting the object existing around the vehicle. The transfer data generation circuit 26b does not output unnecessary information, so that a transmission time is suppressed.

Figure 12:
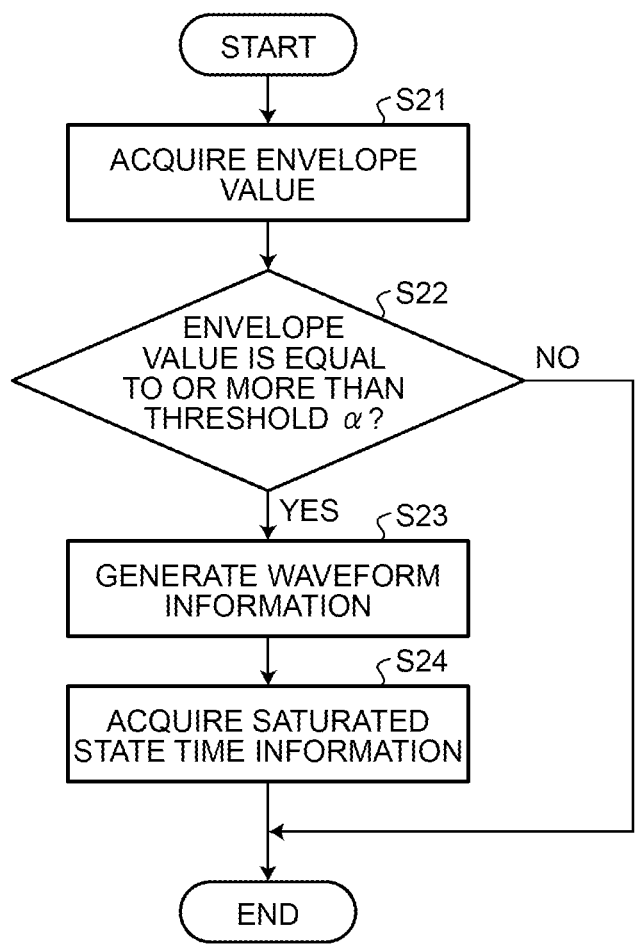
FIG. 12 is a flowchart illustrating an example of an operation of the ranging device according to the third embodiment.

Next, an operation performed by the ranging device 20b configured as described above will be described. In FIG. 12, the signal processing circuit 31 outputs an envelope value obtained by performing envelope processing on an AD value output from the piezoelectric element 23 to the transfer data generation circuit 26b.

The transfer data generation circuit 26b acquires the envelope value output from the signal processing circuit 31 (step S21). Then, the determination circuit 25b determines whether or not the envelope value is equal to or more than the threshold α (step S22). In a case where the determination circuit 25b determines that the envelope value is less than the threshold α (step S22: No), the processing ends. On the other hand, in a case where the determination circuit 25b determines that the envelope value is equal to or more than the threshold α (step S22: Yes), the processing proceeds to step S23.

In the case where the determination circuit 25b determines that the envelope value is equal to or more than the threshold α, the transfer data generation circuit 26b generates waveform information for the envelope value output from the signal processing circuit 31 (step S23). The transfer data generation circuit 26b outputs the generated waveform information to the transfer buffer 27.

Subsequently, the transfer data generation circuit 26b acquires saturated state time information indicating the time T3 at which the envelope value has been in a saturated state and the time T4 at which the saturated state has been resolved (step S24). The transfer data generation circuit 26b outputs the acquired saturated state time information to the transfer buffer 27. When step S24 ends, the processing ends.

As described above, the ranging device 20b according to the third embodiment generates waveform information on the basis of a received signal and a result of enveloping the received signal. Therefore, the ranging device 20b of the third embodiment can suppress loss of real-time property related to an amount of waveform information of a received signal and data transmission.

Note that the foregoing embodiments can be appropriately modified by changing part of the configuration or function of each of the above-described devices. In view of this, hereinafter, some modification examples according to the foregoing embodiments will be described as other embodiments. In the following description, points different from the foregoing embodiments will be mainly described, and detailed description of points common to the contents already described will be omitted. The modification examples described below may be implemented individually or may be implemented in appropriate combination.

First Modification Example

In the above-described first embodiment, the transfer data generation circuit 26 generates waveform information on the basis of a result of determination by the determination circuit 25. In the second embodiment, the transfer data generation circuit 26a generates waveform information on the basis of a time at which the transducer transmits a transmission wave. The transfer data generation circuit 26 according to a first modification example may generate waveform information on the basis of a result of determination by the determination circuit 25 and a time at which the transducer transmits a transmission wave.

For example, the transfer data generation circuit 26 generates an AD value output from the reception circuit 24 as waveform information until the period of time $T_{near}$ clocked by the clocking circuit 29 elapses in a case where the AD value becomes equal to or more than the threshold α (period of time $T_{burst}$).

Figure 13:
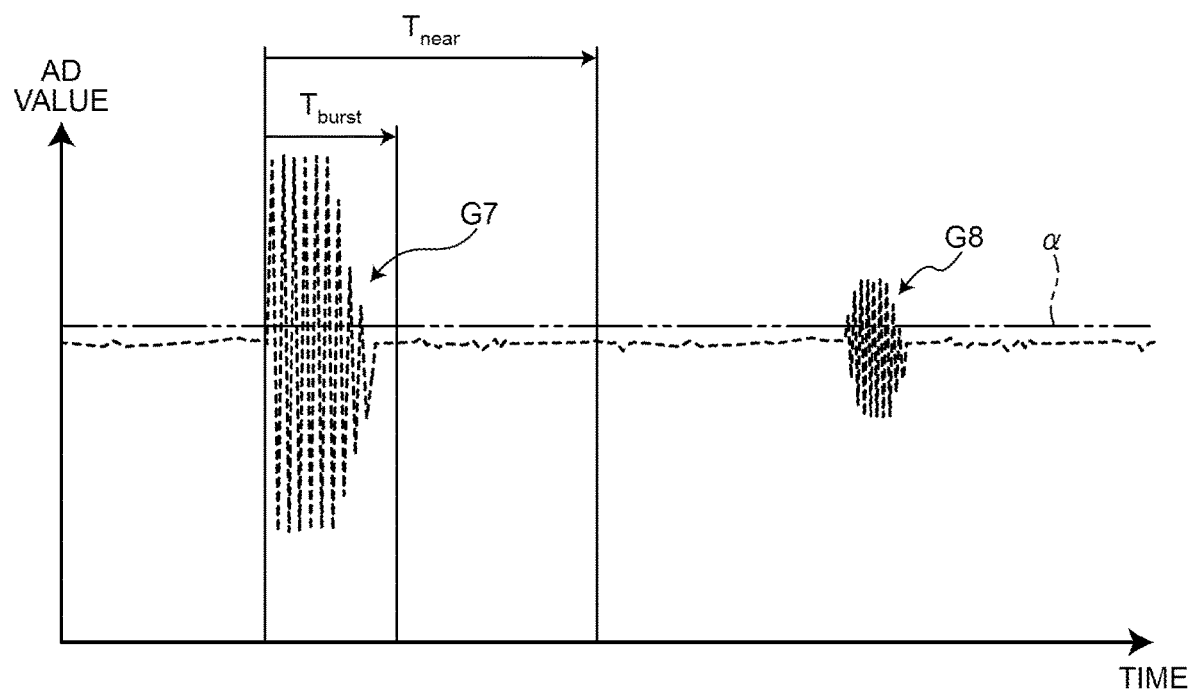
FIG. 13 is a graph illustrating an example of waveform information generated by a ranging device according to a first modification example.

Processing performed by the transfer data generation circuit 26 will be described with reference to FIG. 13. FIG. 13 is a graph illustrating waveform information generated by the transfer data generation circuit 26. The horizontal axis represents time, and the vertical axis represents the AD value. A graph G7 illustrated in FIG. 13 represents an AD value that indicates reverberation of the piezoelectric element 23. A graph G8 illustrated in FIG. 13 represents an AD value corresponding to a reflected wave reflected by an obstacle existing around the vehicle and returning therefrom.

The transfer data generation circuit 26 generates the AD value output from the reception circuit 24 as the waveform information after the period of time $T_{near}$ clocked by the clocking circuit 29 elapses, regardless of whether or not the AD value is equal to or more than the threshold α. Thereafter, the transfer data generation circuit 26 outputs the generated waveform information to the transfer buffer 27.

This processing is performed to receive a received signal mixed with noise together with the noise because a reflected wave from an object at a distant position (long distance) has a small wave height value and has a voltage level substantially equal to that of the noise. Therefore, the transfer data generation circuit 26 generates waveform information, without losing waveform information used for detecting the object existing around the vehicle.

Figure 14:
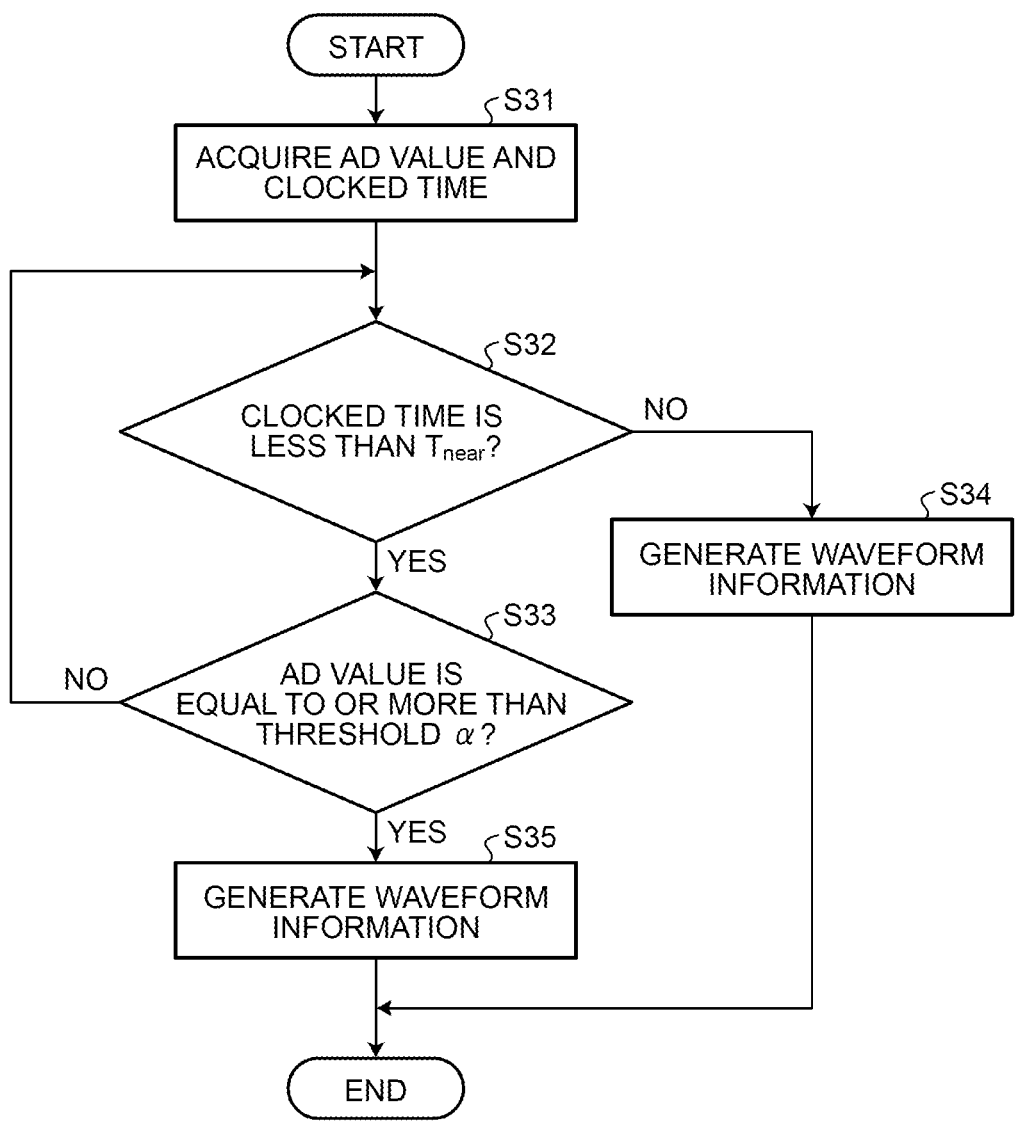
FIG. 14 is a flowchart illustrating an example of an operation of the ranging device according to the first modification example.

Next, an operation performed by the ranging device 20 configured as described above will be described. In FIG. 14, the reception circuit 24 performs analog-to-digital conversion on a voltage output from the piezoelectric element 23 and outputs an AD value to the transfer data generation circuit 26.

The transfer data generation circuit 26 acquires the AD value output from the reception circuit 24 and a clocked time output from the clocking circuit 29 (step S31). The determination circuit 25 determines whether or not the clocked time is less than the predetermined period of time $T_{near}$ (step S32). In a case where the determination circuit 25 determines that the clocked time is less than the predetermined period of time $T_{near}$ (step S32: Yes), the processing proceeds to step S33. On the other hand, in a case where the determination circuit 25 determines that the clocked time is equal to or more than the predetermined period of time $T_{near}$ (step S32: No), the processing proceeds to step S34.

The determination circuit 25 determines whether or not the AD value is equal to or more than the threshold α (step S33). In a case where the determination circuit 25 determines that the AD value is less than the threshold α (step S33: No), the processing returns to step S32. On the other hand, in a case where the determination circuit 25 determines that the AD value is equal to or more than the threshold α (step S33: Yes), the processing proceeds to step S35.

In the case where the determination circuit 25 determines that the clocked time is equal to or more than the predetermined period of time $T_{near}$, the transfer data generation circuit 26 generates waveform information for the AD value output from the reception circuit 24 (step S34). The transfer data generation circuit 26 outputs the generated waveform information to the transfer buffer 27.

In the case where the determination circuit 25 determines that the AD value is equal to or more than the threshold α, the transfer data generation circuit 26 generates waveform information for the AD value output from the reception circuit 24 (step S35). The transfer data generation circuit 26 outputs the generated waveform information to the transfer buffer 27. When steps S34 and S35 end, the processing ends.

As described above, the ranging device 20 according to the first modification example generates waveform information on the basis of a result of threshold determination and a time at which the transducer transmits a transmission wave. Therefore, the ranging device 20 of the first modification example can suppress loss of real-time property related to an amount of waveform information of a received signal and data transmission.

Second Modification Example

In the above-described third embodiment, the signal processing circuit 31 performs envelope processing for extracting an outline of an amplitude from a received signal output from the reception circuit 24. The signal processing circuit 31 according to a second modification example may further perform quadrature detection processing on the received signal output from the reception circuit 24.

Figure 15:
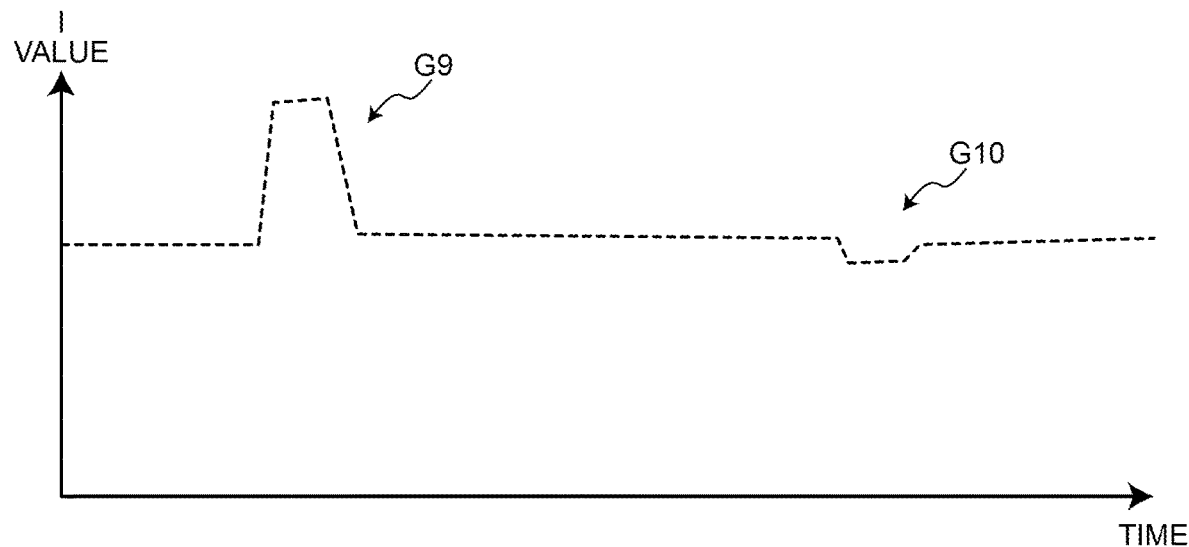
FIG. 15 is a graph illustrating an example of waveform information generated by a ranging device according to a second modification example.

Processing performed by the signal processing circuit 31 will be described with reference to FIGS. 15 and 16. FIG. 15 is a graph illustrating waveform information generated by the signal processing circuit 31. The horizontal axis represents time, and the vertical axis represents an I value. A graph G9 illustrated in FIG. 15 represents an I value that indicates reverberation of the piezoelectric element 23. A graph G10 illustrated in FIG. 15 represents an I value corresponding to a reflected wave reflected by an obstacle existing around the vehicle and returning therefrom.

Figure 16:
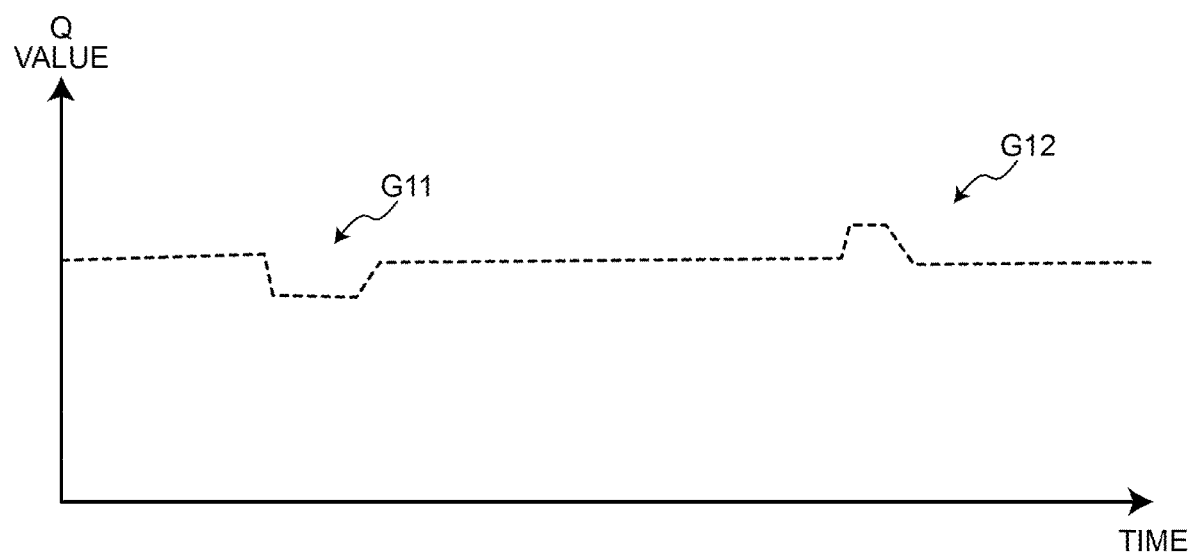
FIG. 16 is a graph illustrating an example of waveform information generated by the ranging device according to the second modification example.

FIG. 16 is a graph illustrating waveform information generated by the transfer data generation circuit 26. The horizontal axis represents time, and the vertical axis represents a Q value. A graph G11 illustrated in FIG. 16 represents a Q value that indicates reverberation of the piezoelectric element 23. A graph G12 illustrated in FIG. 16 represents a Q value corresponding to a reflected wave reflected by the obstacle existing around the vehicle and returning therefrom.

The signal processing circuit 31 performs, for example, quadrature detection processing on the received signal output from the reception circuit 24 and generates the I value (in-phase) indicating an in-phase signal and the Q value (quadrature phase) indicating an orthogonal signal. The signal processing circuit 31 outputs the envelope value, the I value, and the Q value to the transfer data generation circuit 26. In this processing, if the signal processing circuit 31 performs envelope processing for extracting an outline of an amplitude on the received signal output from the reception circuit 24, phase information indicating a phase of the received signal is lost. Therefore, the signal processing circuit 31 performs quadrature detection processing in order to complement the lost phase information.

The determination circuit 25 compares the AD value with the threshold α and determines whether the AD value is equal to or more than the threshold α. In a case where the AD value is determined to be equal to or more than the threshold α, the transfer data generation circuit 26 generates waveform information. The determination circuit 25 compares the envelope value with the threshold α and determines whether the envelope value is equal to or more than the threshold α. In a case where the envelope value is determined to be equal to or more than the threshold α, the transfer data generation circuit 26 generates waveform information. The transfer data generation circuit 26 specifies a target period in which a wave height is equal to or more than the threshold, on the basis of waveforms of the I value and the Q value generated by the signal processing circuit 31. Then, the transfer data generation circuit 26 outputs, to the transfer buffer 27, the generated waveform information and the I value and the Q value generated by the signal processing circuit 31.

The transfer data generation circuit 26 generates waveform information without losing waveform information used for detecting the object existing around the vehicle. The transfer data generation circuit 26 outputs the I value and the Q value to the transfer buffer 27 in order to complement the phase information lost by the envelope processing.

Figure 17:
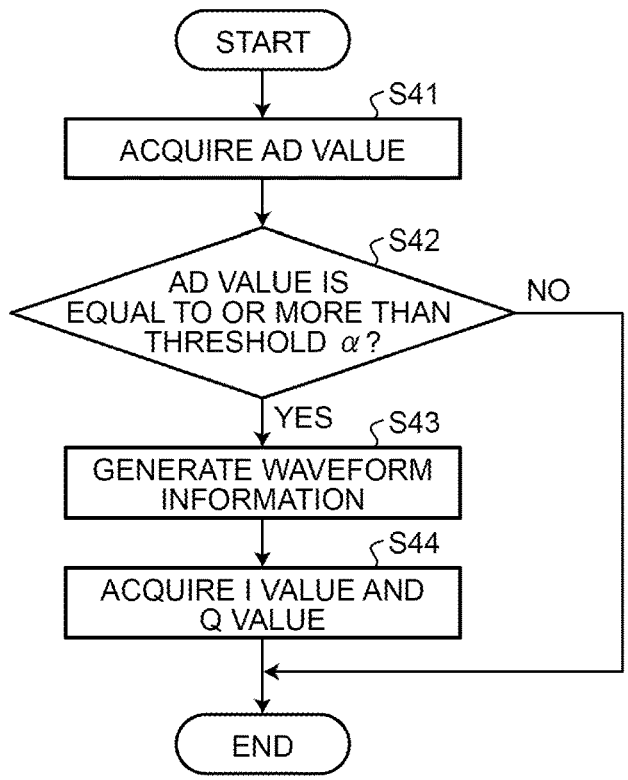
FIG. 17 is a flowchart illustrating an example of an operation of the ranging device according to the second modification example.

Next, an operation performed by the ranging device 20 configured as described above will be described. In FIG. 17, the reception circuit 24 performs analog-to-digital conversion on a voltage output from the piezoelectric element 23 and outputs an AD value to the transfer data generation circuit 26.

The transfer data generation circuit 26 acquires the AD value output from the reception circuit 24 (step S41). The determination circuit 25 determines whether or not the AD value is equal to or more than the threshold α (step S42). In a case where the determination circuit 25 determines that the AD value is less than the threshold α (step S42: No), the processing ends. On the other hand, in a case where the determination circuit 25 determines that the AD value is equal to or more than the threshold α (step S42: Yes), the processing proceeds to step S43.

In the case where the determination circuit 25 determines that the AD value is equal to or more than the threshold α, the transfer data generation circuit 26 generates waveform information for the AD value output from the reception circuit 24 (step S43). The transfer data generation circuit 26 outputs the generated waveform information to the transfer buffer 27.

Subsequently, the transfer data generation circuit 26 acquires the I value and the Q value generated by the signal processing circuit 31 (step S44). The transfer data generation circuit 26 outputs the acquired I value and Q value to the transfer buffer 27. When step S44 ends, the processing ends.

Figure 18:
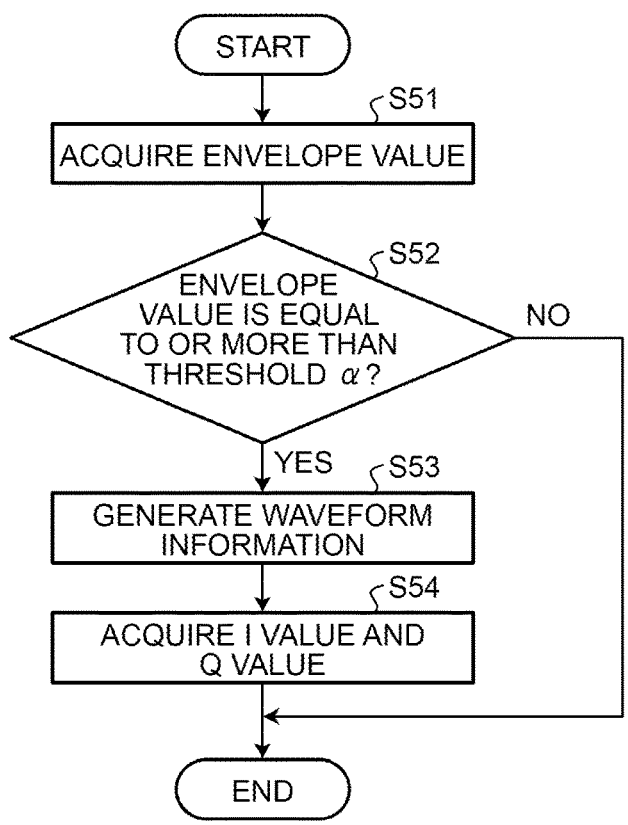
FIG. 18 is a flowchart illustrating an example of an operation of the ranging device according to the second modification example.

Next, in FIG. 18, the signal processing circuit 31 outputs, to the transfer data generation circuit 26, an envelope value obtained by performing envelope processing on an AD value output from the piezoelectric element 23.

The transfer data generation circuit 26 acquires the envelope value output from the signal processing circuit 31 (step S51). The determination circuit 25 determines whether or not the envelope value is equal to or more than the threshold α (step S52). In a case where the determination circuit 25 determines that the envelope value is less than the threshold α (step S52: No), the processing ends. On the other hand, in a case where the determination circuit 25 determines that the envelope value is equal to or more than the threshold α (step S52: Yes), the processing proceeds to step S53.

In the case where the determination circuit 25 determines that the envelope value is equal to or more than the threshold α, the transfer data generation circuit 26 generates waveform information for the envelope value output from the signal processing circuit 31 (step S53). The transfer data generation circuit 26 outputs the generated waveform information to the transfer buffer 27.

Subsequently, the transfer data generation circuit 26 acquires the I value and the Q value generated by the signal processing circuit 31 (step S54). The transfer data generation circuit 26 outputs the acquired I value and Q value to the transfer buffer 27. When step S54 ends, the processing ends.

As described above, the ranging device 20 of the second modification example outputs the I value and the Q value as a result of the envelop processing. Therefore, the ranging device 20 of the second modification example can suppress loss of real-time property related to an amount of waveform information of a received signal and data transmission.

Next, waveform information, which is generated by the ranging device 20 in a case where the foregoing embodiments are implemented in combination, will be described with reference to FIGS. 19, 20, 21, 22, and 23.

Figure 19:
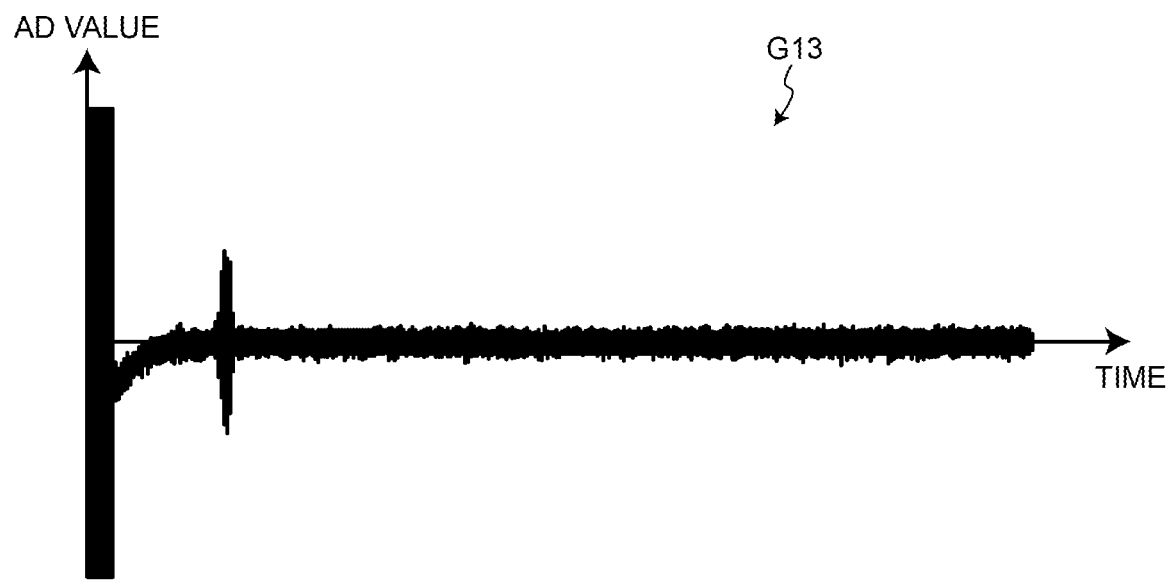
FIG. 19 is a graph illustrating an example of waveform information generated by a ranging device according to a combination.

A graph G13 illustrated in FIG. 19 represents an example that the reception circuit 24 performs analog-to-digital conversion on a voltage output from the piezoelectric element 23 to obtain an AD value and outputs the AD value to the transfer data generation circuit 26. The horizontal axis represents time, and the vertical axis represents the AD value. For example, in a case where the reception circuit 24 acquires the voltage at a sampling rate of 1.25 MSampling/sec during a time of 40 msec, the number of generated data points is 50,000.

Figure 20:
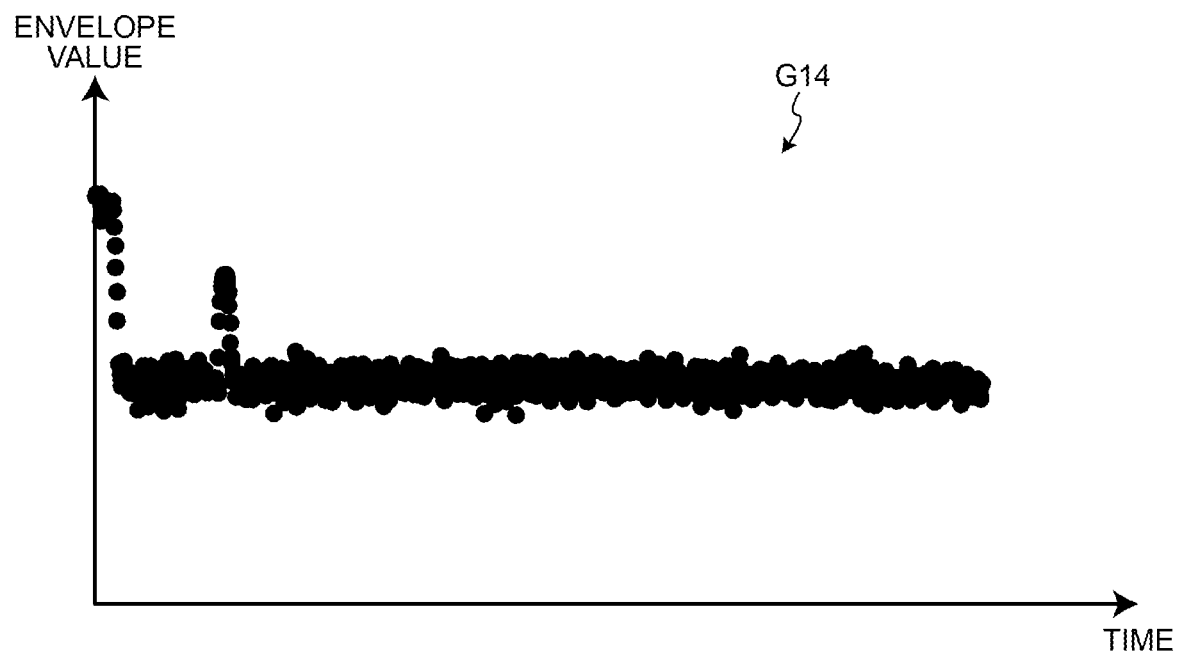
FIG. 20 is a graph illustrating an example of waveform information generated by a ranging device according to a combination.

A graph G14 illustrated in FIG. 20 represents an example that the signal processing circuit 31 performs envelope processing for extracting an outline of an amplitude on the received signal output from the reception circuit 24 (see FIG. 19) to obtain an envelope value and outputs the envelope value to the transfer data generation circuit 26. The horizontal axis represents time, and the vertical axis represents the envelope value. In FIG. 20, it is assumed that the signal processing circuit 31 performs envelop processing on the AD value shown in FIG. 19, and the number of generated data points is 1,143.

Figure 21:
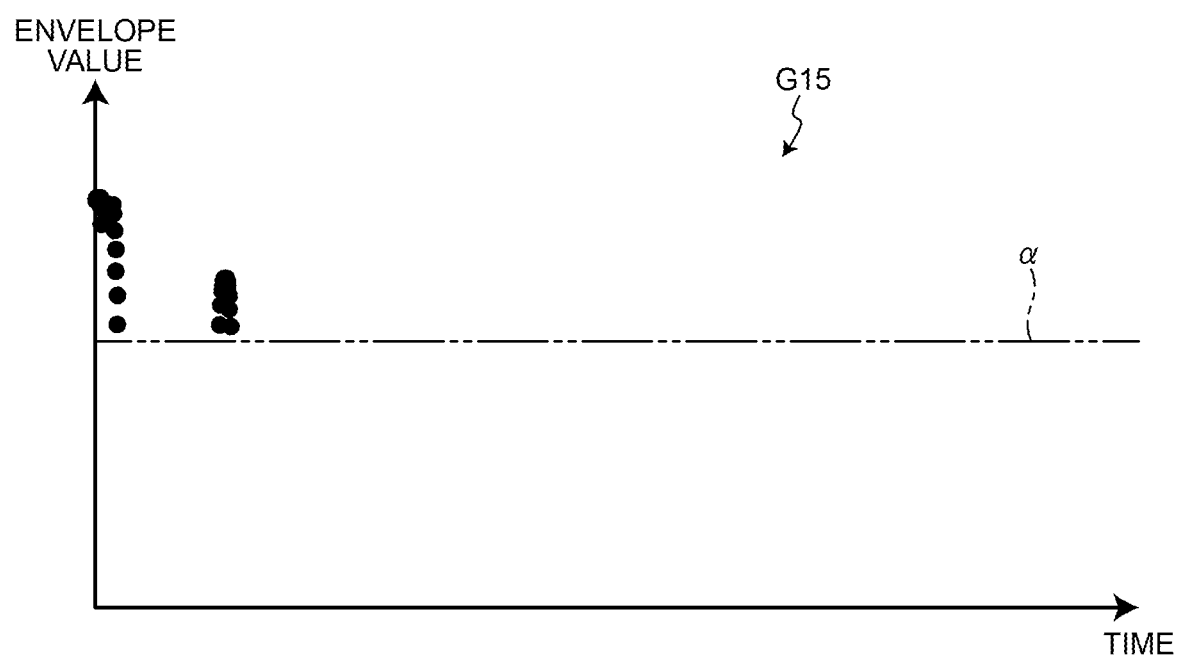
FIG. 21 is a graph illustrating an example of waveform information generated by a ranging device according to a combination.

A graph G15 illustrated in FIG. 21 represents an example that the determination circuit 25 determines that the envelope value is equal to or more than the threshold α, and, as a result, the transfer data generation circuit 26 generates waveform information for the envelope value output from the signal processing circuit 31 (see FIG. 20). The horizontal axis represents time, and the vertical axis represents the envelope value. In this example, in a case where the transfer data generation circuit 26 generates waveform information for the envelope value shown in FIG. 20, the number of generated data points is 44.

Figure 22:
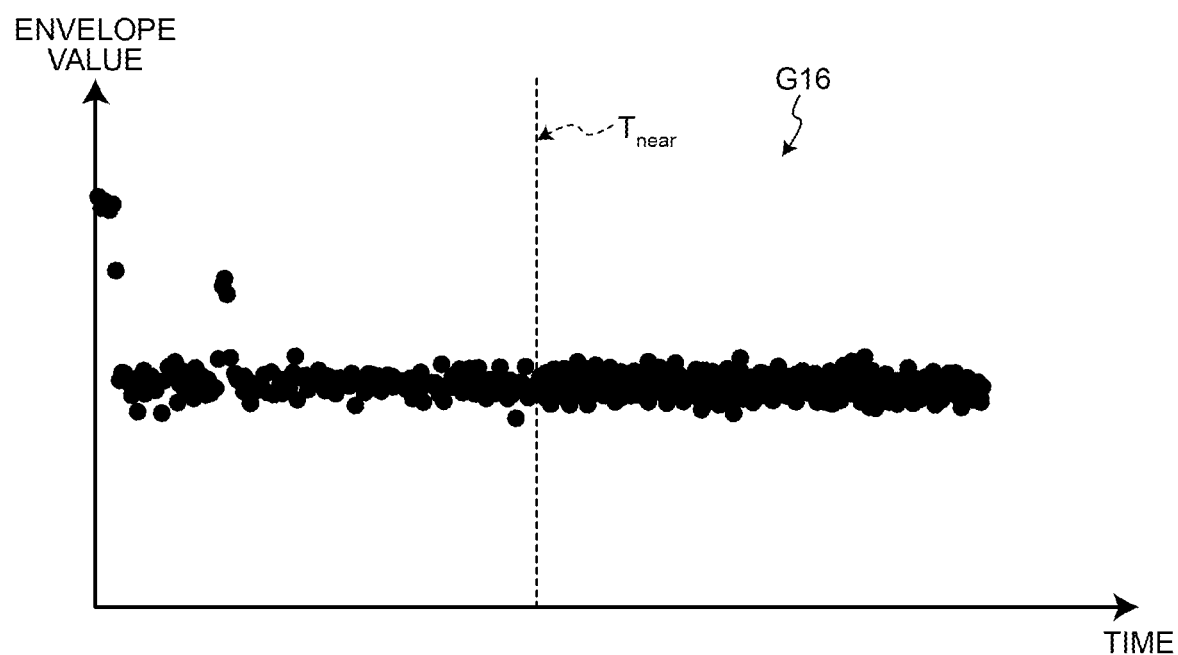
FIG. 22 is a graph illustrating an example of waveform information generated by a ranging device according to a combination.

A graph G16 illustrated in FIG. 22 represents an example that the transfer data generation circuit 26 generates waveform information by thinning out the number of samples from the envelope value output from the signal processing circuit 31 (see FIG. 20) until the period of time $T_{near}$ elapses and generates waveform information without thinning out the number of samples when the period of time $T_{near}$ elapses. The horizontal axis represents time, and the vertical axis represents the envelope value.

Note that $T_{near}$ is set to 0.02 sec. There is no change in the sampling rate after the time period of $T_{near}$ elapses. The sampling rate before the time $T_{near}$ elapses is set to ½ of the sampling rate after the period of time $T_{near}$ elapses. For example, in a case where the transfer data generation circuit 26 generates waveform information by thinning out the number of samples from the envelope value in FIG. 20 until the period of time $T_{near}$ elapses and generates waveform information without thinning out the number of samples when the period of time $T_{near}$ elapses, the number of generated data points is 710. Note that the sampling rate may be changed by changing the sampling frequency of the reception circuit 24.

Figure 23:
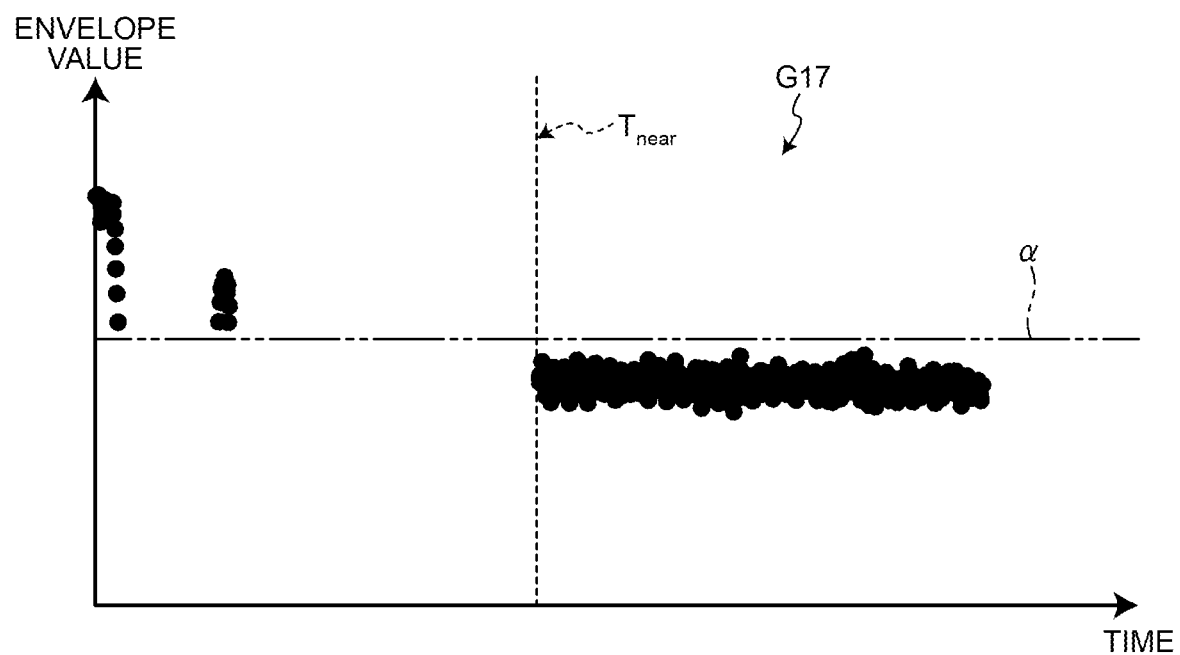
FIG. 23 is a graph illustrating an example of waveform information generated by a ranging device according to a combination.

A graph G17 illustrated in FIG. 23 represents an example that the transfer data generation circuit 26 generates the envelope value output from the signal processing circuit 31 (see FIG. 20) as waveform information in a case where the number of samples are thinned out until the period of time $T_{near}$ clocked by the clocking circuit 29 elapses and the envelope value is equal to or more than the threshold value a. In this example, the transfer data generation circuit 26 generates the envelope value output from the signal processing circuit 31 as waveform information, without thinning out the number of samples and regardless of whether or not the envelope value is equal to or more than the threshold value a after the period of time $T_{near}$ clocked by the clocking circuit 29 elapses. The horizontal axis represents time, and the vertical axis represents the envelope value. $T_{near}$ is set to 0.02 sec.

In a case where the transfer data generation circuit 26 thins out the number of samples from the envelope value in FIG. 20 until the period of time $T_{near}$ clocked by the clocking circuit 29 elapses, generates the envelope value output from the signal processing circuit 31 as waveform information when the envelope value becomes equal to or more than the threshold α, and generates the envelope value output from the signal processing circuit 31 as waveform information after the period of time $T_{near}$ clocked by the clocking circuit 29 elapses, the number of generated data points is 616.

The ranging device 20 according to the combination described above can suppress loss of real-time property related to an amount of waveform information of a received signal and data transmission.

Although some embodiments of the present invention have been described, those embodiments have been presented as examples and are not intended to limit the scope of the invention. Those embodiments can be implemented in various other forms and can be implemented in combination with other embodiments or various other forms. Various omissions, substitutions, and changes can be made within the gist of the invention. Those embodiments and modifications thereof are included in the scope and gist of the invention and are similarly included in the invention described in the claims and the scope equivalent thereto.

The expression of " . . . circuitry" or " . . . circuit" in the foregoing embodiments may be replaced with another expression such as " . . . assembly", " . . . device", " . . . unit", or " . . . module".

In each of the foregoing embodiments, the present disclosure has been described as an example of a configuration using hardware, but the present disclosure can also be implemented by software in cooperation with hardware.

Each functional block used in the description of each of the foregoing embodiments is typically implemented as a large scale integrated circuit (LSI) that is an integrated circuit. The integrated circuit may control each functional block used in the description of the foregoing embodiments and may include an input terminal and an output terminal. Those may be individually provided as one chip, or some or all thereof may be integrated into one chip. Although the LSI is exemplified herein, the LSI may also be referred to as an IC, a system LSI, a super LSI, or an ultra LSI depending on the degree of integration.

A circuit integration method is not limited to the LSI and may be implemented by using a dedicated circuit or a general-purpose processor and a memory. A field programmable gate array (FPGA) that can be programmed after the LSI is fabricated or a reconfigurable processor that can reconfigure connections or settings of circuit cells inside the LSI may be used.

If a circuit integration technology to be replaced with the LSI appears with the progress of the semiconductor technology or another derived technology, the functional blocks may be integrated by using the technology as a matter of course. For example, application of biotechnology is possible.

According to the present disclosure, it is possible to suppress loss of real-time property related to an amount of waveform information of a received signal and data transmission.

What is claimed is:

1. A ranging device including transducers, the ranging device comprising:
    a transmission circuit configured to cause at least one of the transducers to transmit a transmission wave;
    a reception circuit configured to output a received signal obtained by digitizing a reflected wave of the transmission wave by using a sampling frequency equal to or more than a frequency of the transmission wave, the reflected wave being received by each of the transducers;
    a transfer data generation circuit configured to
        separate, into a target period and a non-target period, time-series received signals output from the reception circuit, the target period being a period in which a wave height is equal to or more than a threshold, the non-target period being a period in which a wave height is less than the threshold,
        perform thinning-out processing on received signals in the non-target period, and
        generate waveform information indicating a waveform received by the transducer; and
    a transfer circuit configured to output the waveform information generated by the transfer data generation circuit.

2. The ranging device according to claim 1, wherein the transfer data generation circuit is configured to specify the target period from a waveform of the time-series received signals output from the reception circuit.

3. The ranging device according to claim 1, wherein the transfer data generation circuit is configured to specify, as the target period, a period in which the wave height is equal to or more than the threshold and predetermined periods before and after the period, the target period being specified from the time-series received signals output from the reception circuit.

4. The ranging device according to claim 1, wherein the waveform information includes one or more of a start time of the target period, an end time of the target period, and a sampling cycle of the target period.

5. The ranging device according to claim 1, wherein the transfer data generation circuit is configured to clock a time elapsed from when the transmission wave is transmitted, and change processing of generating the waveform information in accordance with a value of the clocked time.

6. The ranging device according to claim 1, wherein the transfer data generation circuit is configured to clock a time elapsed from when the transmission wave is transmitted, and specify the target period in accordance with a value of the clocked time.

7. The ranging device according to claim 5, wherein the transfer data generation circuit is configured to clock a time elapsed from when the transmission wave is transmitted, and change, in accordance with a value of the clocked time, one or both of the number of bits of a wave height value and a temporal resolution.

8. The ranging device according to claim 1, wherein the transfer data generation circuit is configured to clock a time elapsed from when the transmission wave is transmitted, and specify, as the target period, a period other than a period from a start of the time clocking until a stop of reverberation generated in the transducer having transmitted the transmission wave.

9. The ranging device according to claim 8, wherein the waveform information generated by the transfer data generation circuit includes information on a transmission signal.

10. The ranging device according to claim 1, further comprising a signal processing circuit configured to perform envelope detection processing on the received signal output from the reception circuit, and generate an envelope signal being a processing result of the envelope detection processing.

11. The ranging device according to claim 1, further comprising a signal processing circuit configured to perform logarithmic transformation processing on the received signal output from the reception circuit after envelope detection processing, and generate an envelope signal being a processing result of the logarithmic transformation processing.

12. The ranging device according to claim 10, wherein the transfer data generation circuit is configured to specify, as the target period, a period in which a wave height of the envelope signal is equal to or more than the threshold and predetermined periods before and after the period.

13. The ranging device according to claim 12, wherein the transfer data generation circuit is configured to output the envelope signal generated by the signal processing circuit.

14. The ranging device according to claim 10, wherein the transfer data generation circuit is configured, in a period during which the received signal or the envelope signal is in a saturated state, to output, as the waveform information, information indicating the saturated state and a start time and an end time of the period.

15. The ranging device according to claim 1, further comprising a signal processing circuit configured to perform quadrature detection processing on the received signal output from the reception circuit, and generate an I value and a Q value being a processing result of the quadrature detection processing.

16. The ranging device according to claim 15, wherein the transfer data generation circuit is configured to specify, as the target period, a period in which wave heights of the I value and the Q value are equal to or more than the threshold.

17. The ranging device according to claim 15, wherein the transfer data generation circuit is configured to output the I value and the Q value generated by the signal processing circuit.

18. A ranging method performed by a ranging device including transducers, the ranging method comprising:

causing at least one of the transducers to transmit a transmission wave;

outputting a received signal obtained by digitizing a reflected wave of the transmission wave by using a sampling frequency equal to or more than a frequency of the transmission wave, the reflected wave being received by each of the transducers;

separating, into a target period and a non-target period, time-series received signals output by the outputting, the target period being a period in which a wave height is equal to or more than a threshold, the non-target period being a period in which a wave height is less than the threshold;

performing thinning-out processing on received signals in the non-target period;

generating waveform information indicating a waveform received by the transducer; and outputting the waveform information generated by the generating.

19. A non-transitory computer-readable recording medium on which programmed instructions are recorded, the instructions being executable by a computer serving to control a ranging device including transducers, the instructions causing the computer to:

cause at least one of the transducers to transmit a transmission wave;

output a received signal obtained by digitizing a reflected wave of the transmission wave by using a sampling frequency equal to or more than a frequency of the transmission wave, the reflected wave being received by each of the transducers;

separate, into a target period and a non-target period, time-series received signals, the target period being a period in which a wave height is equal to or more than a threshold, the non-target period being a period in which a wave height is less than the threshold;

perform thinning-out processing on received signals in the non-target period;

generate waveform information indicating a waveform received by the transducer; and output the waveform information.

* * * * *